United States Patent
Osako et al.

(10) Patent No.: US 9,495,950 B2
(45) Date of Patent: Nov. 15, 2016

(54) AUDIO SIGNAL PROCESSING DEVICE, IMAGING DEVICE, AUDIO SIGNAL PROCESSING METHOD, PROGRAM, AND RECORDING MEDIUM

(75) Inventors: Keiichi Osako, Tokyo (JP); Toshiyuki Sekiya, Kanagawa (JP); Mototsugu Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 14/232,748

(22) PCT Filed: May 29, 2012

(86) PCT No.: PCT/JP2012/063753
§ 371 (c)(1),
(2), (4) Date: Jan. 14, 2014

(87) PCT Pub. No.: WO2013/015011
PCT Pub. Date: Jan. 31, 2013

(65) Prior Publication Data
US 2014/0169581 A1    Jun. 19, 2014

(30) Foreign Application Priority Data
Jul. 26, 2011    (JP) ................. 2011-163045

(51) Int. Cl.
*H04B 15/00* (2006.01)
*G10K 11/175* (2006.01)
(Continued)

(52) U.S. Cl.
CPC ......... *G10K 11/175* (2013.01); *G10L 21/0216* (2013.01); *H04N 5/772* (2013.01); *H04N 9/806* (2013.01); *G10L 25/03* (2013.01); *G10L 25/09* (2013.01); *G10L 2021/02085* (2013.01); *H04N 9/8042* (2013.01)

(58) Field of Classification Search
CPC ............. H04R 2499/11; H04N 9/806; H04N 9/8042; H04N 5/213; H04N 5/217; H04N 5/357; H04N 5/3572; G10L 21/0216; G10L 21/0224; G10L 21/0356; G10L 25/03; G10L 25/09; G10L 2021/02085; G10K 2210/00; G10K 2210/1051; G10K 2210/115; G10K 2210/30232; G10K 11/175; G10K 11/16
USPC ........................ 381/94.1, 71.14, 73.1, 71.1
See application file for complete search history.

(56) References Cited

U.S. PATENT DOCUMENTS

| 7,508,948 B2 * | 3/2009 | Klein | .................. H04M 9/082 379/406.01 |
| 2010/0246844 A1 * | 9/2010 | Wolff | ..................... G10L 21/02 381/66 |
| 2011/0234848 A1 * | 9/2011 | Matsumoto | .......... H04N 5/2328 348/231.4 |

FOREIGN PATENT DOCUMENTS

| JP | 8-124299 A | 5/1996 |
| JP | 2011-2723 A | 1/2011 |

(Continued)

OTHER PUBLICATIONS

International Search Report issued Jul. 17, 2012 in PCT/JP2012/063753.

*Primary Examiner* — Ahmad F Matar
*Assistant Examiner* — Sabrina Diaz
(74) *Attorney, Agent, or Firm* — Chip Law Group

(57) ABSTRACT

There is provided an audio signal processing device including a feature amount extraction unit configured to extract, from an audio signal obtained by a sound collection unit, a feature amount that indicates a pulsed operation sound generated from a sound generation unit provided in a same housing as the sound collection unit, and a noise determination unit configured to determine whether or not the operation sound is included in the audio signal based on the feature amount.

15 Claims, 14 Drawing Sheets

| (51) | Int. Cl. | |
|---|---|---|
| | H04N 9/806 | (2006.01) |
| | H04N 5/77 | (2006.01) |
| | G10L 21/0216 | (2013.01) |
| | H04N 9/804 | (2006.01) |
| | G10L 21/0208 | (2013.01) |
| | G10L 25/03 | (2013.01) |
| | G10L 25/09 | (2013.01) |

(56) References Cited

FOREIGN PATENT DOCUMENTS

| JP | 2011-077604 | * | 4/2011 | ............ H04N 5/225 |
|---|---|---|---|---|
| JP | 2011-77604 A | | 4/2011 | |
| JP | 2011-128391 A | | 6/2011 | |
| JP | 2012-27186 A | | 2/2012 | |

* cited by examiner

AUDIO SIGNAL PROCESSING DEVICE, IMAGING DEVICE, AUDIO SIGNAL PROCESSING METHOD, PROGRAM, AND RECORDING MEDIUM

TECHNICAL FIELD

The present disclosure relates to an audio signal processing device, an imaging device, an audio signal processing method, a program, and a recording medium.

BACKGROUND ART

As sound recording devices that collect and record external sounds, video cameras, digital cameras with a moving image capturing function, IC recorders, and the like are known. When such devices are operated, there are cases in which a pulsed operation sound generated from the main body of the devices is incorporated into recorded sounds.

For example, an imaging device equipped with a moving image capturing function collects external sounds around the device using a microphone and records the sounds together with a moving image when the moving image is captured. During the capturing of the moving image, a pulsed operation sound such as a zoom driving sound, a diaphragm driving sound, an auto-focus driving sound, a pressing sound of an operation button, or the like is generated in the housing of the imaging device. Particularly, when an operation of a driving device (a zoom motor, a diaphragm mechanism, a focus motor, or the like) that drives an imaging optical system starts or ends, a pulsed mechanical driving sound such as a "click" made when, for example, a motor engages with a gear is generated.

If such a pulsed operation sound is incorporated into or recorded as a noise on an external sound that a user desires to record, it is quite unpleasant. For this reason, it is necessary for a sound recording device to provide quietness or noise removal in order to reduce such a pulsed operation sound generated during recording.

As methods for reducing a pulsed mechanical driving sound, several methods have been proposed. For example, Patent Literature 1 proposes that in order to lower a reduction processing load to bear when a mechanical driving sound generated from a driving device is to be reduced, the reduction process is executed according to transmission of a driving signal for controlling the driving device. In addition, Patent Literature 2 proposes that input audio data corresponding to a period in which a loud noise is generated from a lens driving unit is interpolated with audio data pieces generated before and after the period based on a driving signal (control signal) for controlling the lens driving unit.

Citation List

Patent Literature

Patent Literature 1: JP 2011-2723A
Patent Literature 2: JP H8-124299A

SUMMARY OF INVENTION

Technical Problem

However, in the technologies of Patent Literature 1 and Patent Literature 2, since the noise reduction process is performed depending on a timing at which the driving signal for controlling the driving device is transmitted, accuracy in reducing the pulsed noise is low, and thereby the quality of an original sound deteriorates. In other words, for a real imaging device, or the like, there are cases in which an operation of the driving device is delayed after a control device transmits a driving signal. Moreover, the method of Patent Literature 1 does not consider the time taken from the generation of a mechanical driving sound to arrival of the sound at the microphone. Thus, if the reduction process is performed according to the transmission of a driving signal as disclosed in Patent Literature 1, an actual noise section is deviated from a noise reduction process section. For this reason, since the reduction process is performed even in a non-noise section, fidelity of the original sound is significantly lowered, which leads to deterioration of the sound quality.

In addition, the technology of Patent Literature 2 considers a delay of a generated noise with respect to a driving signal so that the noise reduction process is performed after a predetermined delay time elapses from the transmission of the driving signal. However, since the set delay time is a fixed value and a case in which an actual delay time varies is not considered, it is difficult to accurately specify a noise section. Thus, it is difficult to accurately match a noise reduction process section with an actual noise section, it is not possible to realize a highly accurate noise reduction process, and accordingly deterioration of the sound quality is a concern.

Furthermore, in Patent Literature 2, it is determined whether or not a noise reduction process is to be performed based on the level (volume) of input audio data and interpolating audio data at a timing of a driving signal. Accordingly, when there is a loud external sound around a device, a noise is relatively inconspicuous, and thus the reduction process is not performed, and conversely, when the periphery of the device is quiet and a noise is conspicuous, the reduction process is performed and accordingly the noise can be removed. However, volume is not the only factor influencing whether a noise is perceived by the human ear. Thus, in the method in which a noise section is determined based only on volume as in Patent Literature 2, the determination accuracy of the noise section is unreliable, there is a possibility of the reduction process being performed in a section in which a noise is not perceived, or conversely, not being performed in a section in which a noise is perceived.

Therefore, it is desirable to provide a technique that enables highly accurate detection of a noise section that includes a pulsed operation sound only from a collected audio signal without using driving control information of a driving device, and improvement of accuracy in noise reduction.

Solution to Problem

According to the present disclosure, there is provided an audio signal processing device including a feature amount extraction unit configured to extract, from an audio signal obtained by a sound collection unit, a feature amount that indicates a pulsed operation sound generated from a sound generation unit provided in a same housing as the sound collection unit, and a noise determination unit configured to determine whether or not the operation sound is included in the audio signal based on the feature amount.

According to the present disclosure, there is provided an imaging device including a sound collection unit configured to convert an external sound into an audio signal, a sound generation unit configured to be provided in a same housing as the sound collection unit and to generate a pulsed operation sound, a feature amount extraction unit configured to extract a feature amount that indicates the operation sound from the audio signal output from the sound collection unit, a noise determination unit configured to determine whether or not the operation sound is included in the audio signal based on the feature amount, and a noise reduction unit configured to perform a noise reduction process on the audio signal when the noise determination unit determines that the operation sound is included in the audio signal.

According to the present disclosure, there is provided an audio signal processing method including extracting a feature amount that indicates a pulsed operation sound generated from a sound generation unit provided in a same housing as a sound collection unit, from an audio signal obtained by the sound collection unit, and determining whether or not the operation sound is included in the audio signal based on the feature amount.

According to the present disclosure, there is provided a program for causing a computer to execute extracting a feature amount that indicates a pulsed operation sound generated from a sound generation unit provided in a same housing as a sound collection unit, from an audio signal obtained by the sound collection unit, and determining whether or not the operation sound is included in the audio signal based on the feature amount.

According to the present disclosure, there is provided a non-transitory computer-readable recording medium having a program recorded therein, the program causing a computer to execute extracting a feature amount that indicates a pulsed operation sound generated from a sound generation unit provided in a same housing as a sound collection unit, from an audio signal obtained by the sound collection unit, and determining whether or not the operation sound is included in the audio signal based on the feature amount.

According to the configurations, a feature amount that indicates a pulsed operation sound generated from the sound generation unit provided in the same housing as the sound collection unit is extracted from an audio signal obtained by the sound collection unit, and based on the feature amount, it is determined whether or not the operation sound is included in the audio signal. Accordingly, using the feature amount extracted from the audio signal, the presence or absence of the pulsed operation sound can be determined with high accuracy.

Advantageous Effects of Invention

According to an embodiment of the present disclosure described above, it is possible to detect a noise section of the pulsed operation sound with high accuracy only from the collected audio signal without using drive control information of a driving device, and to improve accuracy in noise reduction.

DESCRIPTION OF EMBODIMENT

Figure 1:
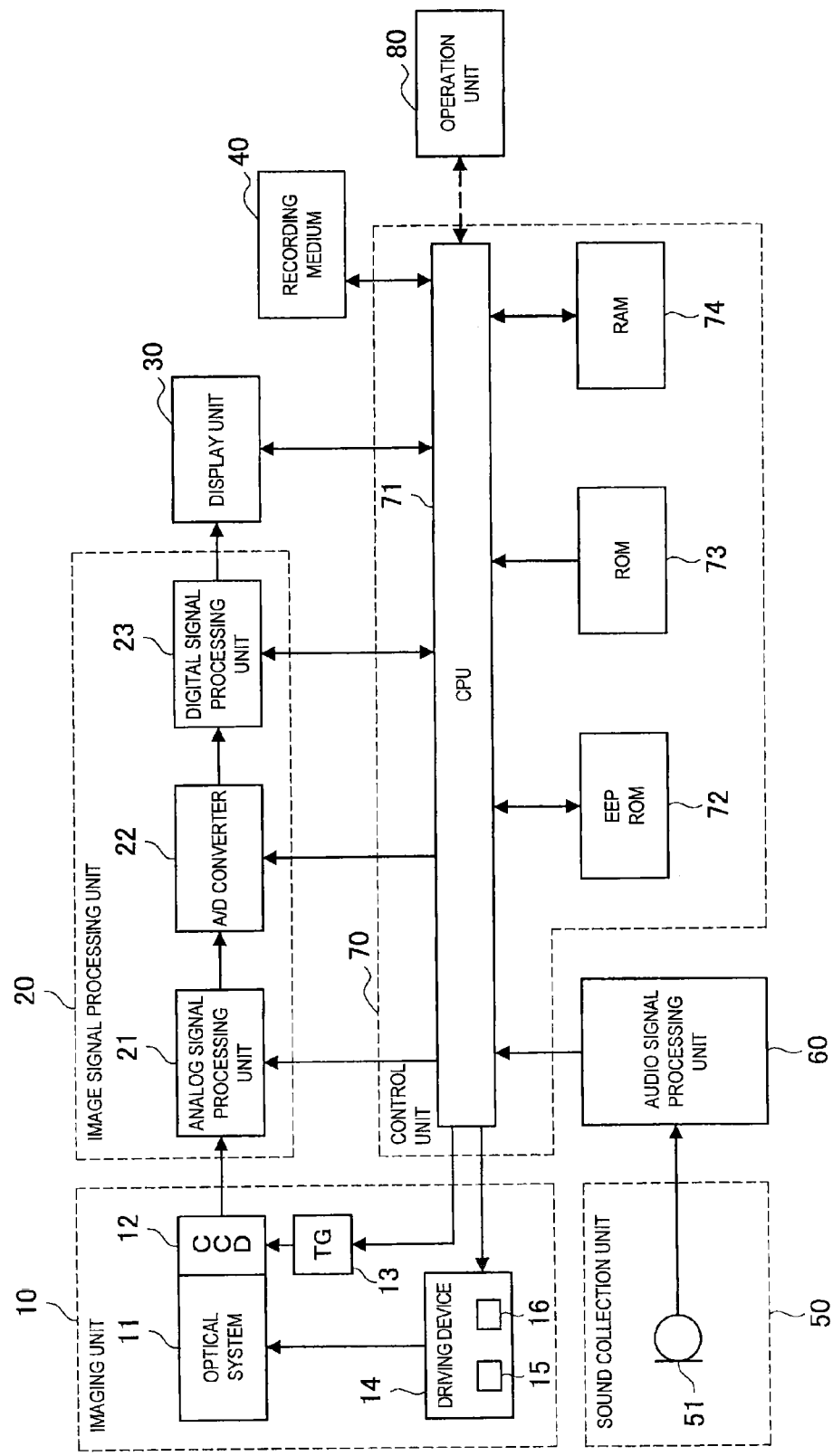
FIG. 1 is a block diagram illustrating a hardware configuration of a digital camera to which an audio signal processing device according to a first embodiment of the present disclosure is applied.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Description will be provided in the following order.
1. First embodiment
    1.1. Overview of a mechanical sound reduction method
    1.2. Configuration of an audio signal processing device
        1.2.1. Hardware configuration of the audio signal processing device
        1.2.2. Functional configuration of the audio signal processing device
    1.3. Specific example of determination methods of a pulsed mechanical sound
        1.3.1. Determination method using a statistical identification method
        1.3.2. Determination method using table determination
    1.4. Audio signal processing method
    1.5. Effect
2. Second embodiment
    2.1. Functional configuration of an audio signal processing device
    2.2. Specific example of determination methods of a pulsed mechanical sound
        2.2.1. Determination method using the statistical identification method
        2.2.2. Determination method using table determination 2.3. Effect
3. Third embodiment
3.1. Functional configuration of an audio signal processing device
3.2. Specific example of determination methods of a pulsed mechanical sound
3.2.1. Determination method using the statistical identification method
3.2.2. Determination method using table determination
3.3 Effect
4. Fourth embodiment
4.1. Functional configuration of an audio signal processing device
4.2. Effect
5. Fifth embodiment
5.1. Functional configuration of an audio signal processing device
5.2. Audio signal processing method
5.3. Effect
6. Sixth embodiment
6.1. Overview of a noise determination method
6.2. Functional configuration of an audio signal processing device
6.3. Modified example of the audio signal processing device
6.4. Effect
7. Seventh embodiment
7.1. Functional configuration of an audio signal processing device
7.2. Effect
8. Conclusion 1. First Embodiment 1.1. Overview of a Mechanical Sound Reduction Method First, an overview of a mechanical sound reduction method using audio signal processing device and method according to a first embodiment of the present disclosure will be described.

The audio signal processing device and method according to the present embodiment relate to a technology for reducing a pulsed operation sound (noise) generated from a sound generating unit (for example, a driving device) installed in a housing of a sound recording device or a sound reproduction device. Particularly, in the present embodiment, when an imaging device equipped with a moving image capturing function records peripheral sounds while capturing a moving image, a pulsed mechanical driving sound generated when an operation of a driving device installed in the imaging device is started or ends is a target of reduction.

Here, the driving device is a driving device installed in the imaging device for performing imaging operations using an imaging optical system, and includes, for example, a zoom motor for moving a zoom lens, a focus motor for moving a focus lens, a diaphragm mechanism, a driving mechanism for controlling a shutter, or the like. The driving device is provided in the same housing as a sound collection unit of the imaging device. In addition, the pulsed mechanical driving sound (hereinafter referred to as a "pulsed mechanical sound") is an instantaneous sound generated when, for example, the various kinds of driving devices described above start or end their operations (for example, a driving sound of the zoom motor, a driving sound of the focus motor, a driving sound of the diaphragm mechanism, a shutter sound, a pressing sound of an operation button, or the like).

The pulsed mechanical sound is, for example, a "click" or "clack" sound generated from engagement of a motor with a gear when an operation of the zoom motor or the like starts or ends.

Hereinafter, an example in which the audio signal processing device is a digital camera having a moving image capturing function and a pulsed mechanical sound that is a noise to reduce is a zoom start sound generated when an operation of optical zoom is started in the digital camera will be described. However, the audio signal processing device and the pulsed mechanical sound according to an embodiment of the present disclosure is not limited to the example.

When a user performs a zoom operation during imaging and sound-recording performed by a digital camera, a zoom motor inside the camera is driven to engage with a gear that drives a zoom lens, and accordingly a loud pulsed mechanical sound (zoom start sound) is generated instantaneously. Then, a microphone of the digital camera collects not only an external sound around the camera that the user desires to record (which includes, for example, an arbitrary sound collected by the microphone, such as an environment sound, a voice of a person, or the like; hereinafter referred to as a "desired sound" or a "background sound") but also such a pulsed mechanical sound generated from the inside of the camera. Thus, recording of the sound is performed in a state in which the pulsed mechanical sound is incorporated into the desired sound, and when the recorded sound is reproduced, the pulsed mechanical sound incorporated into the desired sound is heard by the user, which is unpleasant. Since the pulsed mechanical sound causes vibration of the housing on a frequency of, for example, 200 Hz or lower and is generated around the microphone, the pulsed mechanical sound is collected at a higher volume than the desired sound. Since there is a volume difference between the pulsed mechanical sound and the desired sound as described above, if the mechanical sound is incorporated into the desired sound, the pulsed mechanical sound is conspicuous during reproduction of the recorded sound. Thus, a technology that enables recording of only a desired sound after a pulsed mechanical sound such as a zoom start sound or the like is properly removed during recording or reproduction of a moving image and a sound has been demanded.

In the noise reduction technology of the related art as disclosed in Patent Literature 1 and Patent Literature 2 described above, a section in which a mechanical driving sound is generated (a noise section) is estimated based on a transmission timing of a driving signal for controlling the driving device, and the noise reduction process is performed on the noise section. However, it is difficult to accurately estimate a noise section from the transmission timing of the driving signal due to delay of an actually recorded noise with respect to the driving signal, or the like. In addition, with the method for determining the presence or absence of a noise based only on the level (volume) of an audio signal as disclosed in Patent Literature 2, it is difficult to accurately detect a section in which a noise perceived by the human ear is actually generated.

Thus, in the present embodiment, feature amounts indicating the pulsed mechanical sound are extracted from an audio signal collected by a sound collection unit of an imaging device, the presence or absence of the pulsed mechanical sound is determined using only the feature amounts rather than the driving signal, and accordingly, a noise section that includes the pulsed mechanical sound is detected. Here, the feature amounts indicating the pulsed mechanical sound preferably include: (1) a feature amount indicating a pulse component of the pulsed mechanical sound (which corresponds to a first feature amount); and (2) a reverberation feature amount indicating a reverberation component of the pulsed mechanical sound (which corresponds to a second feature amount). By using the two kinds of feature amounts indicating the pulse component and the reverberation component of the pulsed mechanical sound as described above, the pulsed mechanical sound included in an audio signal can be accurately detected.

Furthermore, (1) the pulse feature amount described above preferably includes: (a) a maximum amplitude value A of a pulse component of the pulsed mechanical sound; and (b) a pulse width W of the pulse component, and (2) the reverberation feature amount preferably includes (c) power P of a narrow-band signal indicating a reverberation component of the pulsed mechanical sound. (a) The maximum amplitude value A and (b) the pulse width W are representative parameters of the pulse feature amount. In addition, (c) the power P of a narrow-band signal indicating a reverberation component of the pulsed mechanical sound (hereinafter referred to as a "reverberation component power P") is a representative parameter of the reverberation feature amount. The narrow-band signal is a signal among audio signals in a low frequency band (for example, 200 Hz or lower) unique to the reverberation component of the pulsed mechanical sound, and the reverberation component power P is, for example, an integrated value of amplitudes of the signal (signal levels) in a predetermined section.

A feature amount extraction unit of the audio signal processing device according to the present embodiment extracts, from audio signals, three feature amounts of (a) the maximum amplitude value A of a pulse component of the pulsed mechanical sound, (b) the pulse width W of the pulse component, and (c) the reverberation component power P. Then, a noise determination unit of the audio signal processing device comprehensively determines whether an audio signal includes a pulsed mechanical sound using vectors x (A, W, and P) of the three extracted feature amounts and a determination coefficient. The determination coefficient necessary for the determination is obtained from a prior learning or a prior setting. In this manner, a pulsed mechanical sound included in an audio signal can be more accurately detected using the three feature amounts (A, W, and P). Hereinafter, a reduction method of a pulsed mechanical sound according to the present embodiment will be described in detail.

1.2. Configuration of an Audio Signal Processing Device

[1.2.1. Hardware Configuration of the Audio Signal Processing Device]

First, with reference to FIG. 1, a hardware configuration of a digital camera to which an audio signal processing device according to the present embodiment is applied will be described. FIG. 1 is a block diagram illustrating a hardware configuration of a digital camera 1 to which the audio signal processing device according to the present embodiment is applied.

The digital camera 1 according to the present embodiment is, for example, an imaging device that can record a moving image and a sound when capturing the moving image. The digital camera 1 images a subject, converts a captured image (which may be a still image or a moving image) obtained from the imaging into digital image data, and records the data on a recording medium together with a sound.

As illustrated in FIG. 1, the digital camera 1 according to the present embodiment broadly has an imaging unit 10, an image signal processing unit 20, a display unit 30, a recording medium 40, a sound collection unit 50, an audio signal processing unit 60, a control unit 70, and an operation unit 80.

The imaging unit 10 images a subject and outputs an analog image signal indicating the captured image. The imaging unit 10 includes an imaging optical system 11, an image sensor 12, a timing generator 13, and a driving device 14.

The imaging optical system 11 is constituted by optical components including various lenses such as a focus lens, a zoom lens, and a correction lens, an optical filter that removes unnecessary wavelengths, a shutter, a diaphragm, and the like. An optical image (subject image) incident from a subject is formed on an exposure face of the image sensor 12 via the optical components of the imaging optical system 11. The image sensor 12 is configured by a solid-state image sensor, for example, a CCD (Charge Coupled Device), a CMOS (Complementary Metal Oxide Semiconductor), or the like. The image sensor 12 performs photoelectric conversion on the optical image guided from the imaging optical system 11, and outputs electric signals (analog image signals) indicating the captured image.

The imaging optical system 11 is mechanically connected to the driving device 14 that drives the optical components of the imaging optical system 11. The driving device 14 includes, for example, a zoom motor 15, a focus motor 16, a diaphragm mechanism (not shown), and the like. The driving device 14 drives the optical components of the imaging optical system 11 according to instructions of the control unit 70 to be described later so as to move the zoom lens and the focus lens, or to adjust the diaphragm. For example, the zoom motor 15 performs a zoom operation of adjusting an angle of view by moving the zoom lens in a telephoto or wide direction. In addition, the focus motor 16 performs a focus operation of focusing on a subject by moving the focus lens.

In addition, the timing generator 13 (hereinafter referred to as the TG 13) generates operation pulses necessary for the image sensor 12 according to instructions of the control unit 70. For example, the TG 13 generates various kinds of pulses such as four-phase pulses for vertical transfer, field shift pulses, two-phase pulses for horizontal transfer, and shutter pulses, and supplies the pulses to the image sensor 12. As the TG 13 drives the image sensor 12, a subject image is captured. In addition, as the TG 13 adjusts a shutter speed of the image sensor 12, an exposure amount and an exposure period of a captured image are controlled (an electric shutter function). Image signals output by the image sensor 12 are input to the image signal processing unit 20.

The image signal processing unit 20 is configured by an electric circuit such as a micro controller, performs a predetermined image process on the image signals output from the image sensor 12, and outputs the image signals that have undergone the image process to the display unit 30 and the control unit 70. The image signal processing unit 20 has an analog signal processing unit 21, an analog-digital (A/D) converter 22, and a digital signal processing unit 23.

The analog signal processing unit 21 is a so-called analog front-end that performs pre-processing on the image signals. The analog signal processing unit 21 performs, for example, a CDS (Correlated Double Sampling) process, a gain process by a programmable gain amplifier (PGA), or the like on the image signals output from the image sensor 12. The A/D converter 22 converts the analog image signals input from the analog signal processing unit 21 into digital image signals, and then outputs the signals to the digital signal processing unit 23. The digital signal processing unit 23 performs a digital signal process, for example, noise removal. white balance adjustment, color correction, edge emphasis, gamma correction, or the like on the input digital image signals, and then outputs the signals to the display unit 30 and the control unit 70.

The display unit 30 is configured as a display device, for example, a liquid crystal display (LCD), an organic EL display, or the like. The display unit 30 displays various kinds of input image data according to control of the control unit 70. For example, the display unit 30 displays captured images (through images) input from the image signal processing unit 20 in real-time during imaging. Accordingly, a user can operate the digital camera 1 while viewing the through image being captured by the digital camera 1. In addition, when a captured image recorded on the recording medium 40 is reproduced, the display unit 30 displays the reproduced image. Accordingly, a user can recognize content of the captured image recorded on the recording medium 40.

The recording medium 40 records various kinds of data such as captured image data, audio data, and metadata of the data thereon. For the recording medium 40, for example, a semiconductor memory such as a memory card, or a disc-type recording medium such as an optical disc, or a hard disk can be used. The optical disc includes, for example, a Blu-ray disc, a DVD (Digital Versatile Disc), a CD (Compact Disc), and the like. The recording medium 40 may be built in the digital camera 1, or may be a removable medium that can be loaded or unloaded on the digital camera 1.

The sound collection unit 50 collects external sounds around the digital camera 1. The sound collection unit 50 according to the present embodiment is a monaural microphone constituted by one microphone 51 for recording external sounds, but may be configured as a stereo microphone constituted by two microphones. The microphone 51 outputs audio signals obtained by collecting external sounds. With the sound collection unit 50, external sounds can be collected and recorded with a moving image during moving image capturing. The microphone 51 is provided in a housing of the digital camera 1 in order to collect external sounds (desired sounds), but also collects mechanical driving sounds of a sound generation unit (the driving device 14) provided inside the housing as noise.

The audio signal processing unit 60 is configured by an electronic circuit such as a micro controller, performs a predetermined sound process on audio signals, and outputs audio signals for recording. The sound process includes, for example, an A/D conversion process, a noise reduction process, and the like. The present embodiment is characterized in that the noise reduction process is performed by the audio signal processing unit 60, and detailed description thereof will be provided later.

The control unit 70 is configured by an electric circuit such as a micro controller, and controls overall operations of the digital camera 1. The control unit 70 includes, for example, a CPU 71, an EEPROM (Electrically Erasable Programmable ROM) 72, a ROM (Read Only Memory) 73, and a RAM (Random Access Memory) 74. The control unit 70 controls each of the units inside the digital camera 1. For example, the control unit 70 controls operations of the audio signal processing unit 60 when a mechanical sound generated by the driving device 14 as a noise is reduced from audio signals collected by the microphone 51.

The ROM 73 of the control unit 70 stores programs that cause the CPU 71 to execute various control processes. The CPU 71 operates based on the programs and executes arithmetic operations and control processes necessary for various kinds of control while using the RAM 74. The programs can be stored in advance in memory devices (for example, the EEPROM 72, the ROM 73, and the like) installed in the digital camera 1. In addition, the programs may be provided to the digital camera 1 by being stored in a removable medium such as a disk-like recording medium, or a memory card, or may be downloaded in the digital camera 1 via a network such as a LAN, or the Internet.

Here, a specific example of control of the control unit 70 will be described. The control unit 70 controls the TG 13 and the driving device 14 of the imaging unit 10 to control imaging processes performed by the imaging unit 10. For example, the control unit 70 performs automatic exposure control (an AE function) by adjusting the diaphragm of the imaging optical system 11, setting an electronic shutter speed of the image sensor 12, setting a gain of the AGC of the analog signal processing unit 21, and the like. In addition, the control unit 70 performs auto focus control (an AF function) for automatically focusing the imaging optical system 11 on a specific subject by moving the focus lens of the imaging optical system 11 and thereby changing a focus position. Furthermore, the control unit 70 adjusts an angle of view of a captured image by moving the zoom lens of the imaging optical system 11 and thereby changing a zoom position. Moreover, the control unit 70 causes various kinds of data such as captured images, metadata, and the like to be recorded on the recording medium 40, and causes data recorded on the recording medium 40 to be read and reproduced. In addition, the control unit 70 causes various display images for being displayed on the display unit 30 to be generated, and controls the display unit 30 to display the display images.

The operation unit 80 and the display unit 30 function as user interfaces that enable a user to operate the digital camera 1. The operation unit 80 is configured by various operation keys such as buttons or levers, or a touch panel, and includes, for example, a zoom button, a shutter button, a power button, and the like. The operation unit 80 outputs instruction information for instructing various imaging operations to the control unit 70 according to user operations.

[1.2.2. Functional Configuration of the Audio Signal Processing Device]

Figure 2:
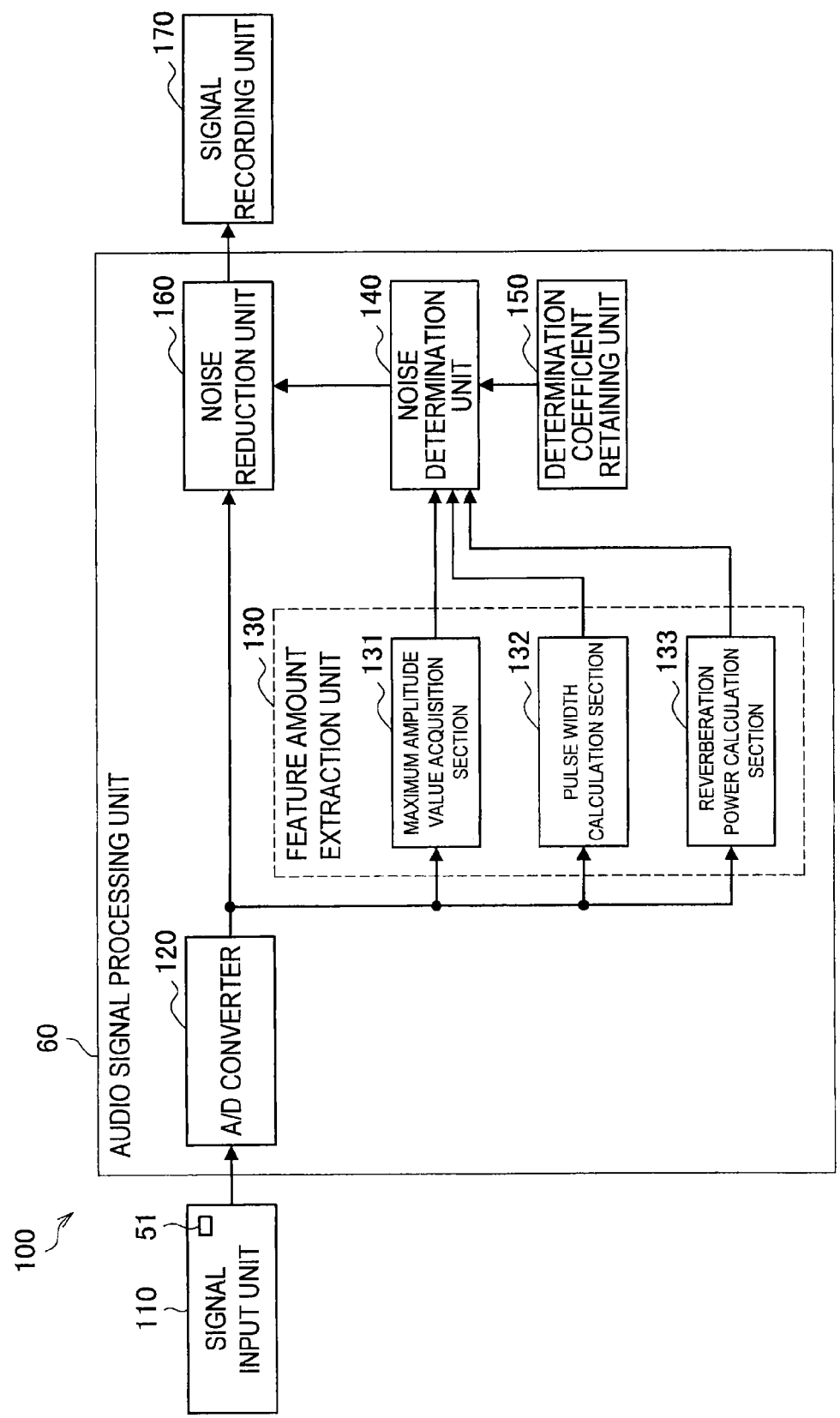
FIG. 2 is a block diagram illustrating a functional configuration of the audio signal processing device according to the embodiment.

Next, with reference to FIG. 2, a functional configuration example of an audio signal processing device applied to the digital camera 1 according to the present embodiment will be described. FIG. 2 is a block diagram illustrating a functional configuration of the audio signal processing device 100 according to the embodiment.

As illustrated in FIG. 2, the audio signal processing device 100 includes a signal input unit 110, an A/D converter 120, a feature amount extraction unit 130, a noise determination unit 140, a determination coefficient retaining unit 150, a noise reduction unit 160, and a signal recording unit 170. The signal input unit 110 has the microphone 51 of FIG. 1 described above. In addition, the A/D converter 120, the feature amount extraction unit 130, the noise determination unit 140, the determination coefficient retaining unit 150, and the noise reduction unit 160 constitutes the audio signal processing unit 60 of FIG. 1 described above. The signal recording unit 170 is constituted by the control unit 70 and the recording medium 40 of FIG. 1 described above.

Each of the units of the audio signal processing device 100 may be configured by dedicated hardware or software. When software is used, a processor of the audio signal processing device 100 may execute a program for realizing the functions of functional units to be described below. The program may be provided to the audio signal processing device 100 via a computer-readable recording medium (for example, an optical disc, a hard disk, a semiconductor memory, or the like), or may be provided to the device via various kinds of communication means. Hereinafter, each of the units of the audio signal processing device 100 will be described.

The signal input unit 110 is constituted by the microphone 51 installed in the housing of the digital camera 1. The microphone 51 of the signal input unit 110 collects a desired sound (sound to be recorded) around the digital camera 1, convert the external sound into audio signals and then output. The audio signals include not only the desired sound but also a noise such as a pulsed mechanical sound and other mechanical driving sound generated from the driving device 14 of the digital camera 1 incorporated therein.

The A/D converter 120 converts the analog audio signals output from the microphone 51 into digital audio signals. The digital audio signals are input to the feature amount extraction unit 130 and the noise reduction unit 160.

The feature amount extraction unit 130 extracts feature amounts indicating the pulsed mechanical sound from the audio signals output from the microphone 51. The feature amount extraction unit 130 functions as (1) a pulse feature amount extraction unit that extracts a pulse feature amount indicating a pulse component of the pulsed mechanical sound, and (2) a reverberation feature amount extraction unit that extracts a reverberation feature amount indicating a reverberation component of the pulsed mechanical sound. Specifically, the feature amount extraction unit 130 includes a maximum amplitude value acquisition section 131 and a pulse width calculation section 132 as the pulse feature amount extraction unit, and a reverberation power calculation section 133 as the reverberation feature amount extraction unit.

The maximum amplitude value acquisition section 131 acquires the maximum value of the amplitude (signal level) of a pulse component of the audio signals, and outputs the maximum amplitude value A as a pulse feature amount. The pulse width calculation section 132 calculates the pulse width W of the pulse component of the audio signals, and outputs the pulse width W as a pulse feature amount. The reverberation power calculation section 133 calculates the power P of a narrow-band signal indicating a reverberation component of the audio signals, and outputs the reverberation power P as a reverberation feature amount.

Figure 3:
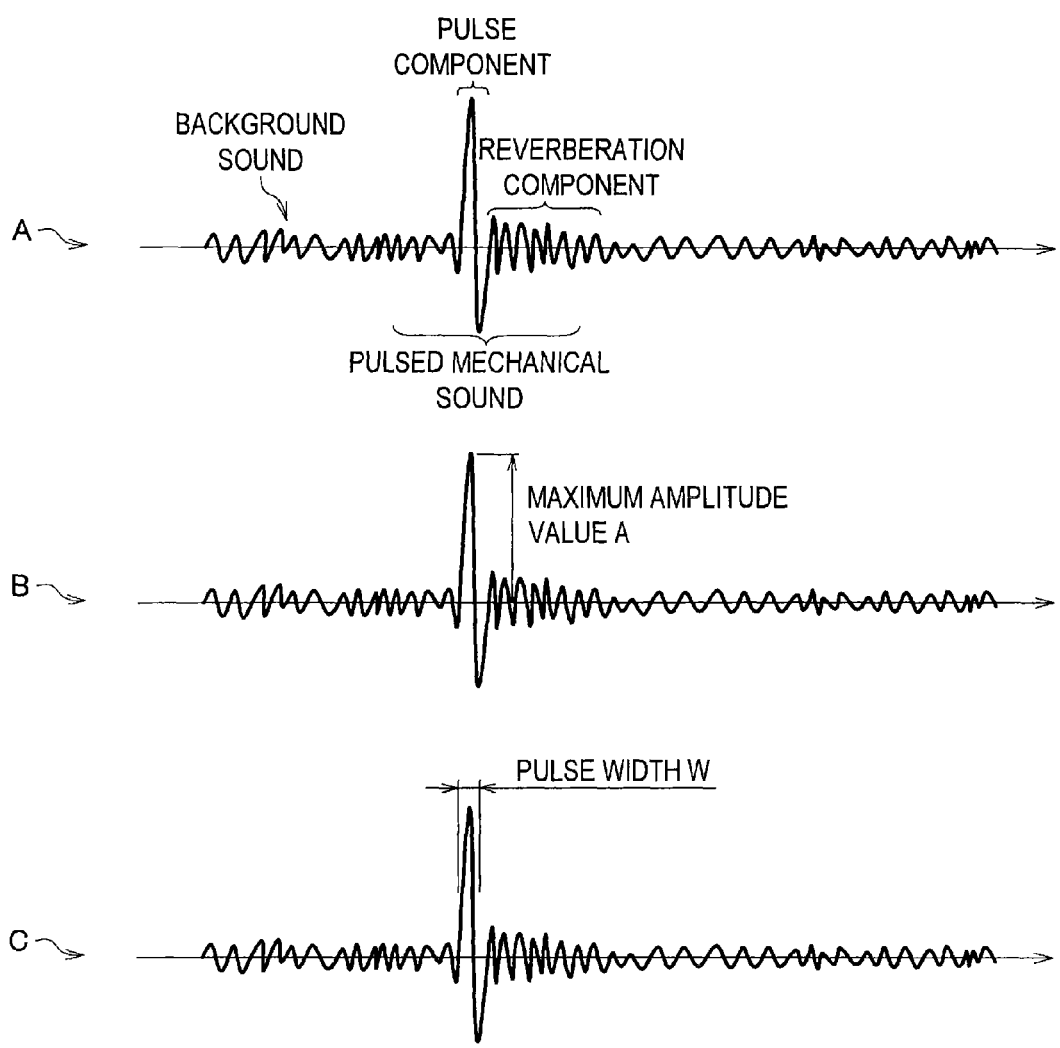
FIGS. 3A to 3C are waveform diagrams of an audio signal that includes a pulsed mechanical sound according to the embodiment.

Here, a pulsed mechanical sound will be described with reference to FIGS. 3A to 3C. FIGS. 3A to 3C are waveform diagrams of an audio signal that includes a pulsed mechanical sound according to the present embodiment.

As illustrated in FIG. 3A, when the driving device 14 starts an operation during sound-recording by the digital camera 1, a pulsed mechanical sound is generated from the driving device 14, and the pulsed mechanical sound is incorporated into the audio signals of an external sound (background sound) as a noise. The pulsed mechanical sound includes a pulse component of which the amplitude momentarily rises and a reverberation component following the pulse component.

The pulse component of the pulsed mechanical sound is a part in which the signal level (amplitude) of the pulsed mechanical sound rises in a pulse shape at the beginning of the generation. The maximum value of the signal level (amplitude) of the pulse component is the maximum amplitude value A (see FIG. 3C). In addition, the pulse width W is a time width of the pulse component, and for example, a time width of the signal level (amplitude) from the maximum amplitude value A to a half thereof (see FIG. 3C).

On the other hand, the reverberation component of the pulsed mechanical sound is a part of narrow-band signals of a specific low frequency band following the pulse component, and has a signal characteristic responding to reverberations of the pulsed mechanical sound. Driving noises generated from the driving device 14, and the like of the digital camera 1 mostly include resonance components of the main body of the digital camera 1, and after the pulse component is generated when the driving device 14 starts an operation, the reverberation component that includes the resonance components of the pulse component is generated. The power of the reverberation component of the pulsed mechanical sound is concentrated on a specific frequency band different from that of a general background sound, for example, a low frequency band equal to or lower than 200 Hz. The power of a narrow-band signal indicating the reverberation component is the reverberation component power P.

As described above, since the pulsed mechanical sound includes the characteristic components of the pulse component and the reverberation component, if the two kinds of components can be detected, presence or absence of a pulse mechanical sound can be accurately detected. Thus, the feature amount extraction unit 130 calculates the three feature amounts (A, W, and P) from the input audio signals. In this case, since it is difficult to calculate a feature amount for each sample data piece of the digital audio signals, the feature amount extraction unit 130 stores data of the audio signals in a predetermined amount (for example, one frame) in a buffer (not shown), and then calculates a feature amount of the one-frame data of the audio signals. Here, one frame of the audio signals may be, for example, 512 samples or 1024 samples, but the value is not limited thereto, and may be an arbitrary number of data pieces.

The maximum amplitude value acquisition section 131 calculates the absolute values of the signal level (amplitude) of data in one frame of the audio signals, and extracts the maximum value among the values, thereby obtaining the maximum amplitude value A. As the volume of the pulse component of the pulsed mechanical sound increases, the maximum amplitude value A increases accordingly. The pulse width calculation section 132 calculates a time width of the signal level (amplitude) of the audio signals from the maximum amplitude value A to, for example, a half thereof, thereby obtaining the pulse width W. As the pulse component of the pulsed mechanical sound steepens, the pulse width W decreases accordingly.

The reverberation power calculation section 133 calculates a value of the power (reverberation component power P) of a narrow-band signal indicating the reverberation component of the pulsed mechanical sound using a band-pass filter (BPF) through which a specific frequency band passes. For example, the reverberation power calculation section 133 takes out signals of a low frequency band of 200 Hz or lower from the audio signals, and integrates signal level values of the signals, thereby obtaining the value of the reverberation component power P. The reverberation power calculation section 133 may calculate the reverberation component power P from a frequency band different from the band of 200 Hz or lower according to a characteristic of a noise. In addition, the reverberation power calculation section 133 may calculate the value of the reverberation component power P from a plurality of frequency bands. In addition, the value of the reverberation component power P may be calculated by computing a power spectrum of the audio signals using a fast Fourier transform (FFT) algorithm.

As described above, the three feature amounts (the maximum amplitude value A, the pulse width W, and the reverberation component power P) obtained by the feature amount extraction unit 130 are input to the noise determination unit 140.

Retuning to FIG. 2, the noise determination unit 140 determines whether or not the pulsed mechanical sound is included in the audio signals based on the feature amounts (the maximum amplitude value A, the pulse width W, and the reverberation component power P) indicating the pulsed mechanical sound. The determination coefficient retaining unit 150 is configured as a memory device such as a memory, and retains determination coefficients used in determining presence or absence of a pulsed mechanical sound by the noise determination unit 140. Since the determination coefficients differ according to the characteristic of the digital camera 1 or the driving device 14, the positional relationship of the microphone 51 and the driving device 14, and the like, determination coefficients set by learning pulsed mechanical sounds generated from devices in advance are stored in the determination coefficient retaining unit 150.

The noise determination unit 140 determines the presence or absence of a pulsed mechanical sound in the audio signals by comprehensively using the feature amount vectors x (A, W, and P) including the three feature amounts obtained by the feature amount extraction unit 130 and the determination coefficients retained in the determination coefficient retaining unit. The noise determination unit 140 determines whether or not a pulsed mechanical sound is included in the audio signals, and specifies a section of the audio signals in which the pulsed mechanical sound is included. The determination method will be described later in more detail.

The noise reduction unit 160 performs a noise reduction process on the audio signals according to the determination result of the noise determination unit 140, thereby removing noises such as the pulsed mechanical sound from the audio signals. To be specific, when a pulsed mechanical sound is determined to be included, the noise reduction unit 160 performs the noise reduction process on the audio signals of the section in which the pulsed mechanical sound is included. On the other hand, when a pulsed mechanical sound is determined not to be included, the noise reduction unit 160 does not perform the noise reduction process. As described above, since the noise reduction process is performed on audio signals of a section in which a pulsed mechanical sound is included (noise section) only when the pulsed mechanical sound is included, processing efficiency of the noise reduction process is enhanced, and accordingly, an unnecessary processing load can be lowered.

As a noise reduction processing method that the noise reduction unit 160 uses, an arbitrary method of the related art can be used, however, there are, for example, the following processing methods. (1) The noise reduction unit 160 may perform gain control for reducing the volume (signal level) of a noise section. (2) In addition, the noise reduction unit 160 may subtract a model signal of a pulsed mechanical sound created in advance from an actual input audio signal. (3) Furthermore, the noise reduction unit 160 may suppress a frequency band of a pulsed mechanical sound (noise band) using a band-stop filter. (4) Furthermore, the noise reduction unit 160 may estimate a signal waveform of a background signal of a noise period in which a pulsed mechanical sound is included based on audio signals before and after the noise section, and then a signal of the noise section may be interpolated using the estimated signal.

The signal recording unit 170 records the digital audio signals in which the pulsed mechanical sound is reduced by the noise reduction unit 160 on a recording medium (not shown). The recording medium may be an arbitrary recording medium such as a magnetic recording medium such as a hard disk or a magnetic tape, an optical recording medium such as a DVD or a Blu-ray disc, or a semiconductor memory such as a flash memory, or a USB memory.

1.3. Specific Example of Determination Methods of a Pulsed Mechanical Sound

Next, a specific example of determination methods of a pulsed mechanical sound used by the noise determination unit 140 of the audio signal processing device 100 according to the present embodiment will be described. Hereinafter, the determination method using a statistical identification method and the determination method using table determination are exemplified.

[1.3.1. Determination Method Using the Statistical Identification Method]

The noise determination unit 140 can determine the presence or absence of a pulsed mechanical sound included in an audio signal based on the statistical identification method that uses a linear identification device, an artificial neural network, or the like. For example, in the statistical identification method using a linear identification device, the weighted average of the feature amounts is calculated as a determination value y using the following expression (I).

$$y = \sum_{i=0}^{I-1} w_i \cdot x_i + w_I \quad (1)$$

Wherein i is an index indicating a dimension, and I is a total number of dimensions of a load coefficient vector $w_i$. $x_i$ indicates a feature amount vector (for example, three feature amount vectors extracted by the feature amount extraction unit 130 are $x_0$=A, $x_1$=W, and $x_2$=P). $w_i$ is a pre-set load (an example of the determination coefficient), and $w_1$ is a constant for deciding a threshold value of determination.

The noise determination unit 140 determines the presence or absence of a pulsed mechanical noise in one frame of an audio signal using the determination value y obtained using the expression (1) above. For example, the noise determination unit 140 determines whether or not the determination value y is equal to or higher than a predetermined threshold value $y_0$ (for example, $y_0$=0). As a result, if $y \geq y_0$, the noise determination unit 140 determines that a pulsed mechanical noise is present in the one frame, and if $y < y_0$, it is determined that a pulsed mechanical sound is not present in the one frame.

The load $w_i$ and the threshold value $y_0$ correspond to the determination coefficients, and are retained by the determination coefficient retaining unit 150 in advance. The $w_i$ is created based on a number of pre-recorded noise samples for learning. For example, correct answers for whether something is a noise or a non-noise are given to a number of the noise samples, and by using an optimization method such as a method of steepest descent, Newton's method, or the like, a load $w_i$ that has highest identification performance of a noise and a non-noise can be set.

[1.3.2. Determination Method Using Table Determination]

The noise determination unit 140 can determine the presence or absence of a pulsed mechanical sound included in an audio signal using a table indicating threshold values of pre-set feature amounts. The noise determination unit 140 determines the presence or absence of a pulsed mechanical sound using a table 142 as shown in, for example, FIG. 4.

Figure 4:
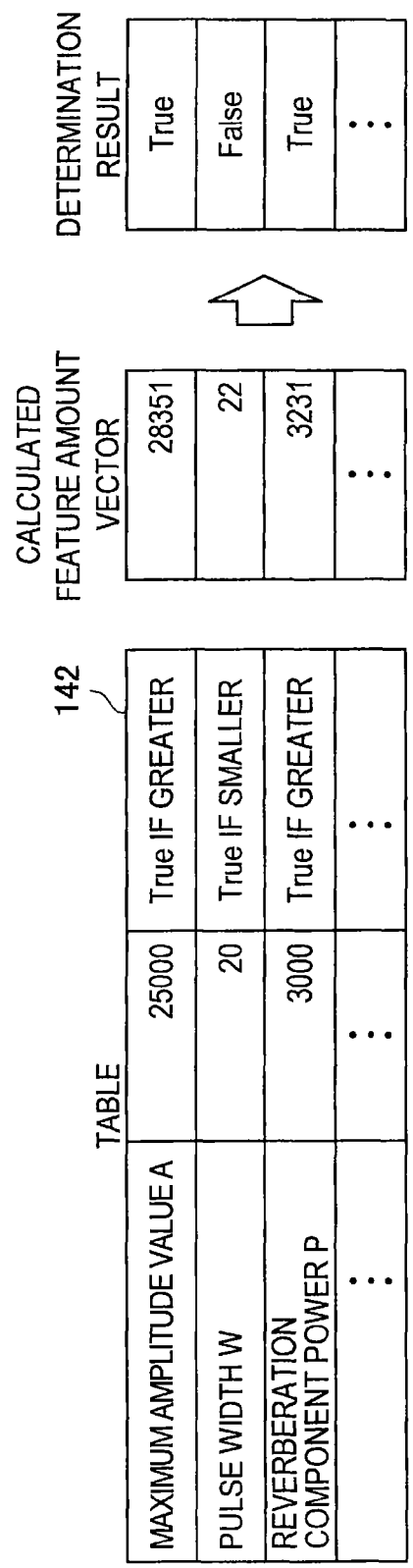
FIG. 4 is a descriptive diagram showing a determination method of a pulsed mechanical sound according to the embodiment.

As shown in FIG. 4, in the table 142, threshold values $A_0$, $W_0$, $P_0$, ... of the feature amounts A, W, P, ... and information relating to a determination reference are stored. If, for example, the threshold value $A_0$ of the maximum amplitude value A is 25000 and an actual maximum amplitude value A exceeds $A_0$, determination on the maximum amplitude value A is set to be positive (True). The noise determination unit 140 compares the actual maximum amplitude value A, the pulse width W, and the reverberation component power P calculated by the feature amount extraction unit 130 to the threshold values $A_0$, $W_0$, and $P_0$ retained in the table 142, and then determines each item of the feature amounts to be positive or negative. In the example of the drawing, the items of the maximum amplitude value A and the reverberation component power P are determined to be positive (True) and the item of the pulse width W is determined to be negative (False).

Furthermore, the noise determination unit 140 compares the number of positively determined items z to the threshold value thereof $z_0$. As a result, if $z \geq z_0$, the noise determination unit 140 determines that a pulsed mechanical sound is present in one frame of an audio signal, and if $z < z_0$, it is determined that a pulsed mechanical sound is not present in the one frame. When $z_0=3$, for example, the number of positively determined items z is 2 in the example of the drawing, and therefore a pulsed mechanical sound is determined not to be present in the one frame of the audio signal.

As described above, the threshold values $A_0$, $W_0$, $P_0$, ..., the threshold value $z_0$ of the number of positively determined items z, and the like correspond to the determination coefficients. The table 142 that includes the determination coefficients and the determination reference is retained in the determination coefficient retaining unit 150 in advance. The determination coefficients in the table 142 are created based on pre-recorded noise samples. A designer of the audio signal processing device 100 can, for example arbitrarily set the determination coefficients according to a characteristic of an actual pulsed mechanical sound.

1.4. Audio Signal Processing Method

Figure 5:
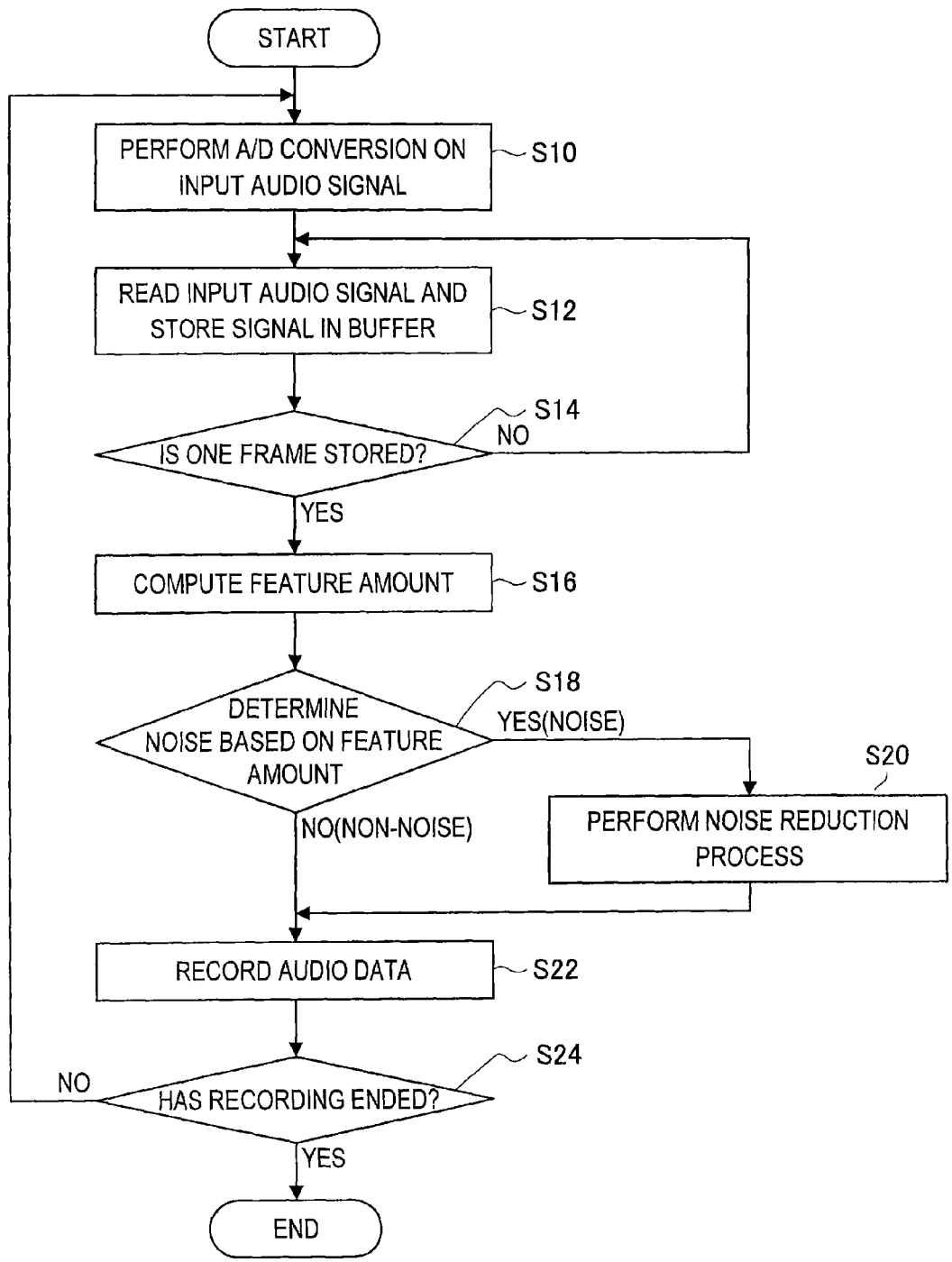
FIG. 5 is a flowchart for describing an audio signal processing method according to the embodiment.

Next, with reference to FIG. 5, an audio signal processing method (mechanical sound reduction method) using the audio signal processing device 100 will be described. FIG. 5 is a flowchart for describing the audio signal processing method according to the present embodiment.

As shown in FIG. 5, during imaging and sound-recording by the digital camera 1 equipped with the audio signal processing device 100 according to the present embodiment, external sound around the digital camera is collected by the microphone 51, and accordingly audio signals are output. Then, the A/D converter 120 of the audio signal processing device 100 converts the analog audio signals input from the microphone 51 into digital audio signals (S10).

Next, the feature amount extraction unit 130 reads the input audio signals that have undergone A/D conversion in S10, and stores the signals in a buffer (S12). After data of the audio signals for one frame which is a unit for processing in the noise determination process is stored in the buffer (S14), the feature amount extraction unit 130 computes feature amounts indicating a pulsed mechanical sound using the data of the audio signals for the one frame (S16). To be specific, the feature amount extraction unit 130 computes the maximum amplitude value A and the pulse width W of a pulse component of the pulsed mechanical sound as pulse feature amounts, and computes the reverberation component power P of the pulsed mechanical sound as a reverberation feature amount.

Furthermore, the noise determination unit 140 determines whether or not a pulsed mechanical sound is included in the one frame of the input audio signals using the feature amounts A, W, and P obtained in S16 and the determination coefficients described above (S18). As a result, when it is determined that a pulsed mechanical sound is included, the noise reduction unit 160 executes the noise reduction process on the one frame of the input audio signals to remove noises including the pulsed mechanical sound (S20). Then, the signal recording unit 170 records the audio signals of which the noises are removed in S20 on a recording medium (S22).

On the other hand, when it is determined in S18 that a pulsed mechanical sound is not included, the noise reduction unit 160 does not execute the noise reduction process on the one frame of the input audio signals, and the signal recording unit 170 records the one frame of the input audio signal on the recording medium (S22).

Then, the processes of S10 to S22 are repeated on the next one frame of the input audio signals until the imaging and sound-recording operation by the digital camera 1 ends (S24).

1.5. Effect

Hereinabove, the configuration of the audio signal processing device 100 according to the first embodiment of the present disclosure and the audio signal processing method that uses the configuration have been described. According to the present embodiment, the audio signal processing device 100 extracts the three feature amounts indicating a pulsed mechanical sound from audio signals input from the microphone 51, and then determines presence or absence of the pulsed mechanical sound using the feature amounts. Accordingly, without using driving control information of the driving device 14 that is a noise generation source, the presence or absence of the pulsed mechanical sound and a section thereof can be accurately detected only using input signals of actually collected sounds.

In addition, the audio signal processing device 100 performs the noise reduction process only on a noise section of audio signals in which the pulsed mechanical sound is detected. Accordingly, it is possible to precisely match a noise section in which the pulsed mechanical sound is actually included with a noise reduction process section, and the reduction process is performed in a non-noise section, or conversely, omitted in a noise section. Therefore, deterioration of sound quality in the non-noise section of audio signals is not a concern, a highly accurate noise reduction process can be realized, and fidelity of collected external sounds (desired sounds) can be enhanced.

Furthermore, in the noise determination process, a pulsed mechanical sound perceived by the human ears can be detected with high accuracy using not only the feature amount relating to the volume (signal level) of audio signals (maximum amplitude value A) but also the pulse width W of the pulsed mechanical sound and the reverberation component power P of the pulsed mechanical sound. Thus, the noise reduction process is executed on a non-noise section in which a noise is not perceived by the human ears, or conversely, omitted in a noise section in which a noise is perceived. Thus, quality of desired sounds (background sounds) of external sounds does not deteriorate, and only an unpleasant noise such as a pulsed mechanical sound can be appropriately removed.

In addition, since the driving control information of the driving device 14 that is a noise generation source is not used, a system configuration of the audio signal processing device 100 and the digital camera 1 can be simplified. Furthermore, since a noise (pulsed mechanical sound) is detected only from data of recorded audio signals, without using the driving control information, the determination of the presence or absence of the noise and the reduction process can be executed not only during recording of the audio signals by an audio signal recording device but also during reproduction of the audio signals by an audio signal reproduction device.

2. Second Embodiment

Next, an audio signal processing device and audio signal processing method according to a second embodiment of the present disclosure will be described. The audio signal processing device according to the second embodiment is characterized in that the number of zero-crossing times N of a signal indicating a reverberation component is used as a reverberation feature amount (second feature amount) instead of the reverberation component power P. Since other functional configurations of the second embodiment are substantially the same as those of the first embodiment, detailed description thereof will be omitted.

2.1. Functional Configuration of an Audio Signal Processing Device

Figure 6:
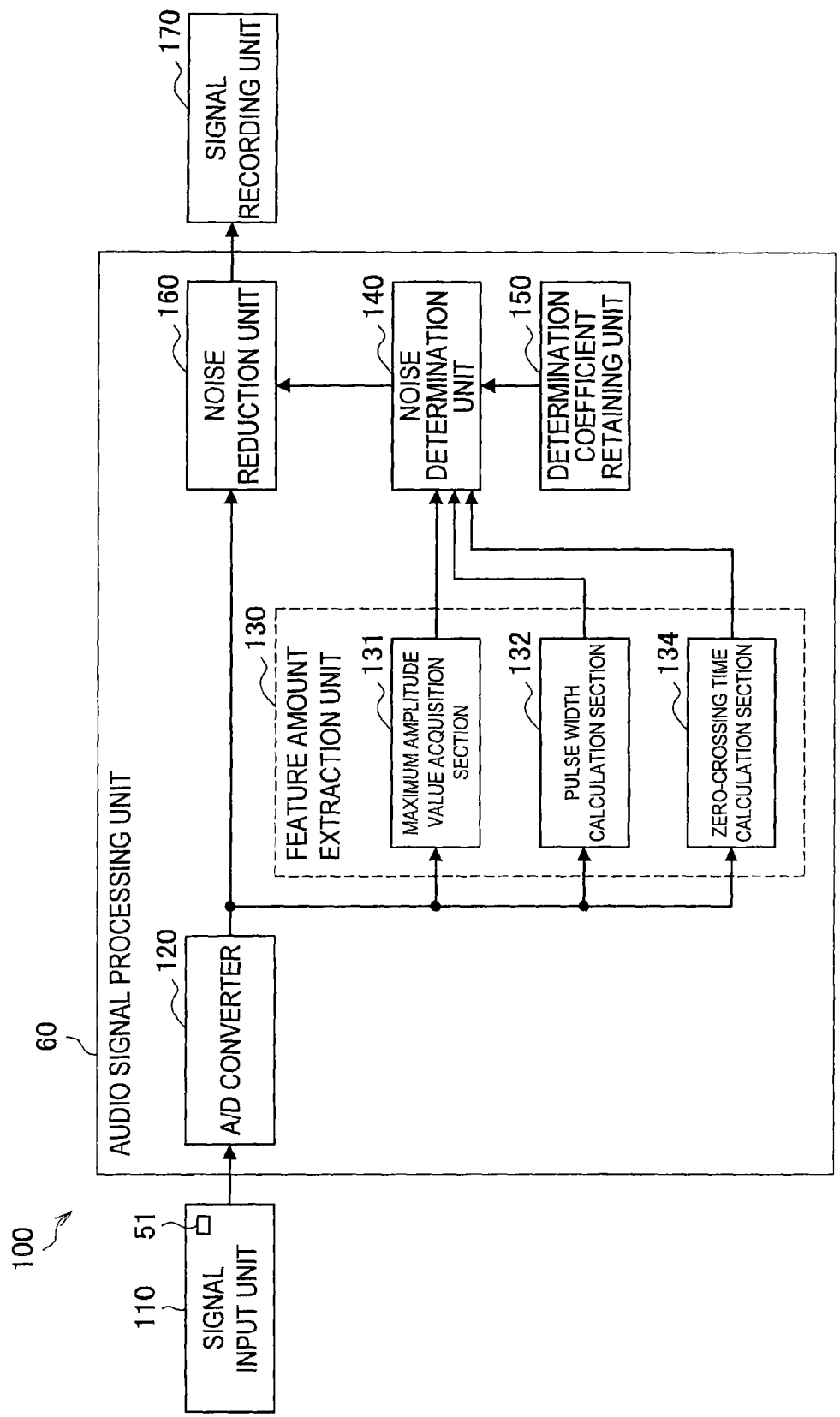
FIG. 6 is a block diagram illustrating a functional configuration of an audio signal processing device according to a second embodiment of the present disclosure.

First, with reference to FIG. 6, a functional configuration of the audio signal processing device 100 according to the second embodiment will be described. FIG. 6 is a block diagram illustrating a functional configuration of the audio signal processing device 100 according to the second embodiment.

As illustrated in FIG. 6, the audio signal processing device 100 includes the signal input unit 110, the A/D converter 120, the feature amount extraction unit 130, the noise determination unit 140, the determination coefficient retaining unit 150, the noise reduction unit 160, and the signal recording unit 170 as in the first embodiment. In addition, the feature amount extraction unit 130 is characterized by including the maximum amplitude value acquisition section 131 and the pulse width calculation section 132 as a pulse feature amount extraction unit as in the first embodiment, and by including a zero-crossing time calculation section 134 as a reverberation feature amount extraction unit.

The zero-crossing time calculation section 134 calculates the number of zero-crossing times N of a narrow-band signal indicating a reverberation component of a pulsed mechanical sound. Here, the number of zero-crossing times N is the number of zero-cross points of the narrow-band signal. A zero-cross point is a point at which a positive signal value of an audio signal having a time waveform reaches a negative value, or a negative signal value reaches a positive value. At a zero-cross point, a signal value of an audio signal is zero. As the number of zero-crossing times increases, an audio signal has a higher frequency component, and as the number of zero-cross points decreases, an audio signal has a lower frequency component. In this manner, the number of zero-cross points serves as a parameter indicating a low frequency component included in an audio signal.

As described above, a narrow-band signal indicating a reverberation component of a pulsed mechanical sound is a signal of a specific low frequency band (for example, 200 Hz or lower), and has a different frequency band from a general background sound. Thus, if the number of zero-crossing times N of an audio signal in a predetermined section is counted, it can be determined whether or not a reverberation component of a pulsed mechanical sound is included in the section using the number of zero-crossing times N.

Thus, the zero-crossing time calculation section 134 takes out a signal of a low frequency band of, for example, 200 Hz or lower from, for example, a predetermined section (for example, one frame) of an audio signal, counts the number of zero-cross points of the signal, and thereby obtains the number of zero-crossing times N. Then, the zero-crossing time calculation section 134 outputs the number of zero-crossing times N to the noise determination unit 140 as the reverberation feature amount (second feature amount).

The zero-crossing time calculation section 134 may calculate the number of zero-crossing times N of a signal of a frequency band different from the band of 200 Hz or lower according to a characteristic of a noise. In addition, the zero-crossing time calculation section 134 may calculate the number of zero-crossing times N of a signal of a plurality of frequency bands. Furthermore, the zero-crossing time calculation section 134 may use a value obtained by dividing the number of zero-crossing times N by the number of samples in one frame of an audio signal as the reverberation feature amount, instead of using the number of zero-crossing times N.

The noise determination unit 140 determines whether or not a pulsed mechanical sound is included in an audio signal based on the feature amounts (the maximum amplitude value A, the pulse width W, and the number of zero-crossing times N) indicating the pulsed mechanical sound. In this case, the noise determination unit 140 compares the number of zero-crossing times N obtained by the zero-crossing time calculation section 134 to a pre-set threshold value $N_0$ of the number of zero-crossing times N, and if $N_0 > N$, it is determined that a reverberation component of the pulsed mechanical sound is present in the section of the audio signal.

2.2. Specific Example of Determination Methods of a Pulsed Mechanical Sound

Next, specific examples of determination methods of a pulsed mechanical sound used by the noise determination unit 140 of the audio signal processing device 100 according to the second embodiment will be described. In the same manner as in the first embodiment, for example, the determination method using the statistical identification method, the determination method using table determination, or the like can also be used in the second embodiment.

[2.2.1. Determination Method Using the Statistical Identification Method]

The noise determination unit 140 can determine presence or absence of a pulsed mechanical sound in an audio signal using the statistical identification method that uses the linear identification device, the artificial neural network, or the like. In the statistical identification method that uses the linear identification device, for example, the weighted average of the feature amounts is calculated as the determination value y using the expression (1) described above. In this case, as $x_i$ in the expression (1), the vectors of the three feature amounts extracted by the feature amount extraction unit 130 $\{x_i=(A, W, N)\}$ are used. Since other points are the same as in the first embodiment, detailed description thereof is omitted.

[2.2.2. Determination Method Using Table Determination]

The noise determination unit 140 can determine presence or absence of a pulsed mechanical sound in an audio signal using a table that indicates pre-set threshold values of the feature amounts. The noise determination unit 140 determines the presence or absence of a pulsed mechanical sound using the table 144 as illustrated in, for example, FIG. 7.

Figure 7:
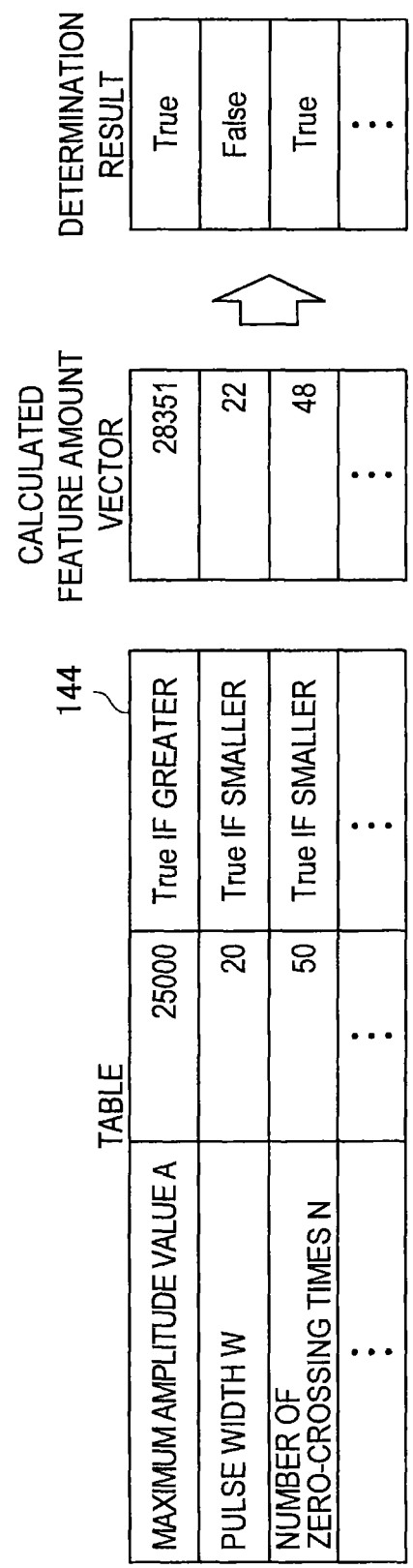
FIG. 7 is a descriptive diagram showing a determination method of a pulsed mechanical sound according to the embodiment.

As shown in FIG. 7, in the table 144, threshold values $A_0$, $W_0$, $N_0$, . . . of the feature amounts A, W, N, . . . and information relating to a determination reference are stored. For example, if the threshold value $N_0$ of the number of zero-crossing times N is 50 and the actual number of zero-crossing times N is less than $N_0$, the number of zero-crossing times N is set to be determined to be positive (True). The noise determination unit 140 compares the actual maximum amplitude value A, pulse width W, and number of zero-crossing times N calculated by the feature amount extraction unit 130 to the threshold values $A_0$, $W_0$, and $N_0$ stored in the table 144, and then determines positivity or negativity of the items of the feature amounts. In the example of the drawing, the items of the maximum amplitude value A and the number of zero-crossing times N are determined to be positive (True), and the item of the pulse width W is determined to be negative (False).

Furthermore, in the same manner as in the first embodiment, the noise determination unit 140 compares the number of positively determined items z to the threshold value $z_0$, and then determines whether or not a pulsed mechanical sound is included in one frame of an audio signal based on the comparison result. The threshold values $A_0$, $W_0$, $N_0$, . . . , and the threshold value $z_0$ of the number of positively determined items z correspond to the determination coefficients for determining the presence or absence of the pulsed mechanical sound.

2.3. Effect

Hereinabove, the configuration of the audio signal processing device 100 according to the second embodiment of the present disclosure and the noise determination method that uses the configuration have been described. The procedure of the audio signal processing method using the audio signal processing device 100 is the same as that in the first embodiment (refer to FIG. 5).

According to the second embodiment, since the presence or absence of a reverberation component of a pulsed mechanical sound can be appropriately determined by using the number of zero-crossing times N as a reverberation feature amount, whether or not the pulsed mechanical sound is included in an audio signal can be accurately detected. Thus, the same effect as in the first embodiment described above is obtained in the second embodiment.

3. Third Embodiment

Next, an audio signal processing device and an audio signal processing method according to a third embodiment of the present disclosure will be described. The audio signal processing device according to the third embodiment is characterized in that another additional feature amount (a third feature amount) is also used in addition to the three feature amounts A, W, and P. Since other functional configurations of the third embodiment are substantially the same as those of the first embodiment, detailed description thereof will be omitted.

3.1. Functional Configuration of an Audio Signal Processing Device

Figure 8:
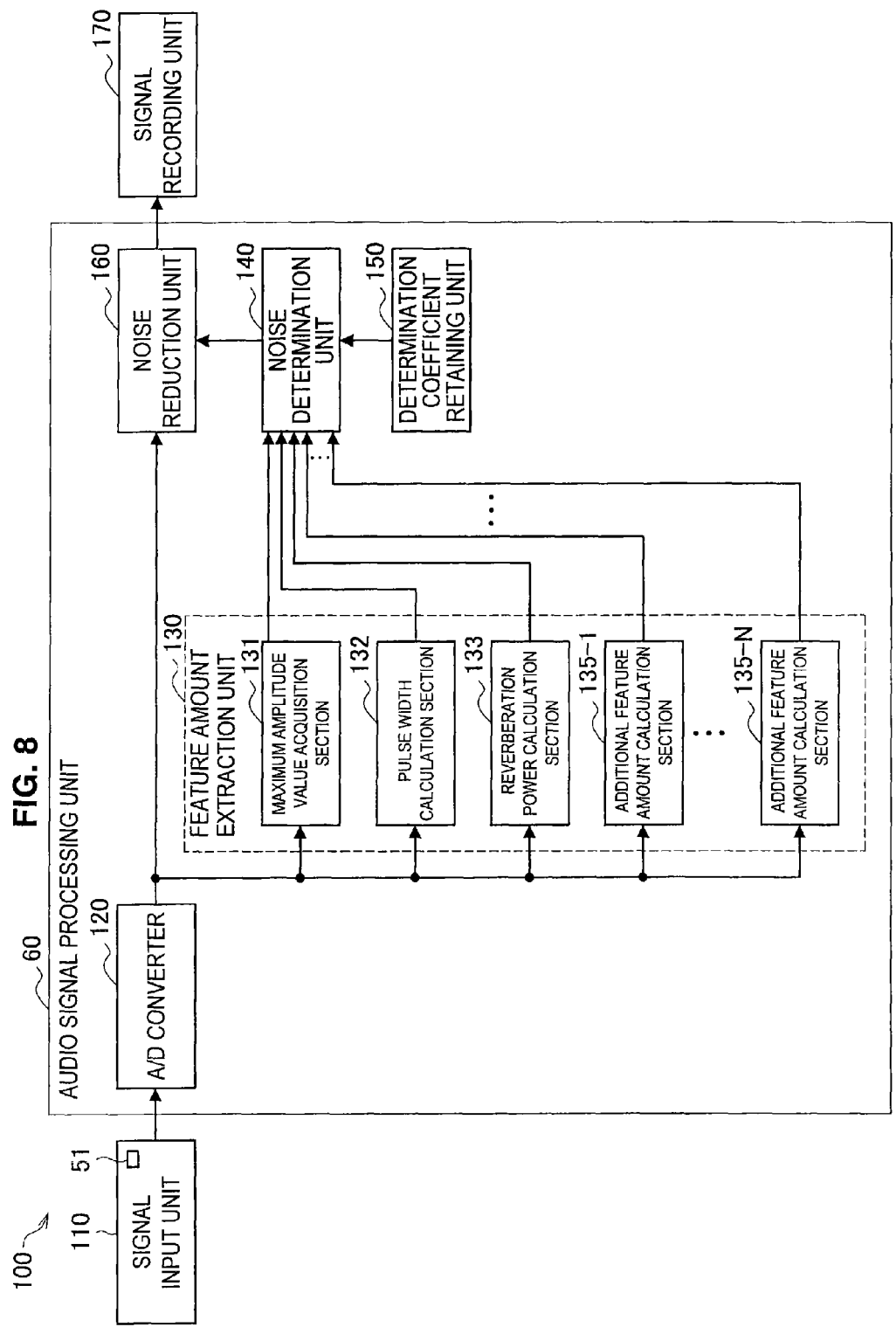
FIG. 8 is a block diagram illustrating a functional configuration of an audio signal processing device according to a third embodiment of the present disclosure.

First, with reference to FIG. 8, a functional configuration of the audio signal processing device 100 according to the third embodiment will be described. FIG. 8 is a block diagram illustrating the functional configuration of the audio signal processing device 100 according to the third embodiment of the present disclosure.

As illustrated in FIG. 8, the audio signal processing device 100 includes the signal input unit 110, the A/D converter 120, the feature amount extraction unit 130, the noise determination unit 140, the determination coefficient retaining unit 150, the noise reduction unit 160, and the signal recording unit 170 as in the first embodiment. In addition, the feature amount extraction unit 130 is characterized by including one or two or more additional feature amount calculation sections 135-1 to N (N is an arbitrary natural number) in addition to the maximum amplitude value acquisition section 131, the pulse width calculation section 132 and the reverberation power calculation section 133.

The additional feature amount calculation sections 135-1 to N (hereinafter, collectively referred to as the additional feature amount calculation section 135) calculate an additional feature amount B in addition to the basic feature amounts (the maximum amplitude value A, the pulse width W, and the reverberation component power P) used in the first embodiment.

Here, the additional feature amount B is, for example, (a) a root mean square (RMS) of an audio signal, (b) a value of change of the RMS, (c) a changed amplitude value of a narrow-band signal indicating a reverberation component of the pulsed mechanical sound, (d) the number of zero-crossing times N of the narrow-band signals, (e) a value of change of the number of zero-crossing times N, or the like. The additional feature amount calculation section 135 may calculate only some or all of the various additional feature amounts.

(a) The RMS of an audio signal indicates average energy in a section of an audio signal, and corresponds to a pulse feature amount indicating a pulse component of a pulsed mechanical sound. When the audio signal includes a noise, the RMS indicates energy of the noise or audio signals around the noise. Thus, when an audio signal includes a pulsed mechanical sound, the RMS of a section of the pulse component increases, the RMSs before and after the section decrease, and thus the presence or absence of a pulse component can be detected using the RMS.

(b) The value of change of the RMS indicates time progress of the RMS corresponding to a pulse feature amount indicating a pulse component of a pulsed mechanical sound. By comparing energy changes of an audio signal between a section that includes a pulsed mechanical sound and the sections before and after the section with a value of change of the RMS, the presence or absence of the pulsed mechanical sound can be more accurately detected, or a signal waveform of a pulse component of the pulsed mechanical sound or the like can be closely analyzed.

(c) The changed amplitude value of a narrow-band signal indicates time progress of the amplitude of a reverberation component of a pulsed mechanical sound corresponding to a reverberation feature amount indicating a reverberation component of the pulsed mechanical sound. By comparing amplitude changes of an audio signal between a section that includes the reverberation component of the pulsed mechanical sound and the sections before and after the section with the changed amplitude value of a narrow-band signal, the presence or absence of the pulsed mechanical sound can be more accurately detected, or a signal waveform of the reverberation component of the pulsed mechanical sound, or the like can be closely analyzed.

(d) The number of zero-crossing times N of a narrow-band signal indicates energy of a reverberation component of a pulsed mechanical sound corresponding to the reverberation feature amount indicating a reverberation component of the pulsed mechanical sound. As described in the second embodiment, the presence or absence of the reverberation component of the pulsed mechanical sound can be more accurately detected with the number of zero-crossing times N.

(e) The value of change of the number of zero-crossing times N indicates time progress of the number of zero-crossing times N of a narrow-band signal indicating a reverberation component of a pulsed mechanical sound corresponding to the reverberation feature amount indicating a reverberation component of the pulsed mechanical sound. By comparing the numbers of zero-crossing times of an audio signal between a section that includes the reverberation component of the pulsed mechanical sound and the sections before and after the section with the value of change of the number of zero-crossing times N, the presence or absence of the pulsed mechanical sound can be more accurately detected, or a signal waveform of the reverberation component of the pulsed mechanical sound, or the like can be closely analyzed.

In this manner, the additional feature amount calculation section 135 computes the various kinds of additional feature amounts B, and outputs the computed additional feature amounts B to the noise determination unit 140. The noise determination unit 140 determines the presence or absence of a pulsed mechanical sound using the three basic feature amounts (the maximum amplitude value A, the pulse width W, and the reverberation component power P) and at least one of the additional feature amounts B (which correspond to the first, second and third feature amounts).

3.2. Specific Example of Determination Methods of a Pulsed Mechanical Sound

Next, specific examples of determination methods of a pulsed mechanical sound used by the noise determination unit 140 of the audio signal processing device 100 according to the third embodiment will be described. In the third embodiment, for example, the determination method using the statistical identification method, the determination method using table determination, or the like can also be used as in the first embodiment.

[3.2.1. Determination Method Using the Statistical Identification Method]

In the determination method using the statistical identification method, four or more feature amount vectors $x_i = (A, W, P, B_1, B_2, B_N)$ in which the three basic feature amounts A, W, and P and at least one of the additional feature amounts B are used as $x_i$ of the expression (1) described above. Since other points are the same as the first embodiment, detailed description thereof is omitted.

The load $w_i$ of each feature amount in the expression (1) may be changed according to the degree of importance of each of the feature amounts and a characteristic of the pulsed mechanical sound. For example, the load $w_i$ of the basic feature amounts A, W, and P may be set to be greater than the load $w_i$ of the additional feature amount B. In addition, when the plurality of additional feature amounts $B_1$, $B_2$, ..., and $B_N$ are used, the loads $w_i$ may be set to be greater for more important additional feature amounts B (for example, the number of zero-crossing times N). Accordingly, accuracy in determining the presence or absence of the pulsed mechanical sound can improve.

[3.2.2. Determination Method Using Table Determination]

In addition in the determination method using table determination, the presence or absence of a pulsed mechanical sound in an audio signal is determined using a table (refer to FIG. 4) indicating pre-set threshold values of feature amounts, as in the first embodiment. In the table, the threshold values $A_0$, $W_0$, $N_0$, $B_{1\_0}$, $B_{2\_0}$, ..., and $B_{N\_0}$ of the feature amounts A, W, P, $B_1$, $B_2$, ..., and $B_N$ and information relating to a determination reference are stored. The noise determination unit 140 compares the actual feature amounts A, W, P, $B_1$, $B_2$, ..., and $B_N$ to the threshold values $A_0$, $W_0$, $N_0$, $B_{1\_0}$, $B_{2\_0}$, ..., and $B_{N\_0}$ retained in the table 144, and then determines positivity or negativity of the items of the feature amounts. Furthermore, the noise determination unit 140 compares the number of positively determined items z to the threshold value $z_0$ thereof, and then determines whether or not a pulsed mechanical sound is included in one frame of an audio signal based on the comparison result. Since this determination method is the same as in the first embodiment, detailed description thereof is omitted.

3.3. Effect

Hereinabove, the configuration of the audio signal processing device 100 according to the third embodiment of the present disclosure and the noise determination method that uses the configuration have been described. The procedure of the audio signal processing method using the audio signal processing device 100 is the same as that in the first embodiment (refer to FIG. 5).

According to the third embodiment, the presence or absence of a pulsed mechanical sound is determined using the additional feature amounts B in addition to the basic feature amounts A, W, and P. Thus, the third embodiment exhibits the effect that the presence or absence of a pulsed mechanical sound can be more accurately detected and a signal waveform of the pulsed mechanical sound or the like can be more exactly detected, in addition to the effect of the first embodiment described above.

In the third embodiment, although the example of using the reverberation component power P as a basic feature amount and using the number of zero-crossing times N as an additional feature amount has been described, the present technology is not limited to the example. For example, the number of zero-crossing times N and a value of change thereof may be used as a basic feature amount instead of the reverberation component power P, and the reverberation component power P or a value of change thereof, or the like may be used as an additional feature amount.

4. Fourth Embodiment

Next, an audio signal processing device and an audio signal processing method according to a fourth embodiment of the present disclosure will be described. The audio signal processing device according to the fourth embodiment is characterized in that a plurality of feature amounts are extracted from a plurality of sections of an audio signal, and the presence or absence of a pulsed mechanical sound is determined based on the plurality of feature amounts. In this case, the plurality of feature amounts are computed (for example, the sum or the average value is computed), and using the computed value as a new feature amount, the presence or absence of a pulsed mechanical sound may be determined. Since other functional configurations of the fourth embodiment are substantially the same as those of the first or the third embodiment, detailed description thereof will be omitted.

4.1. Functional Configuration of an Audio Signal Processing Device

Figure 9:
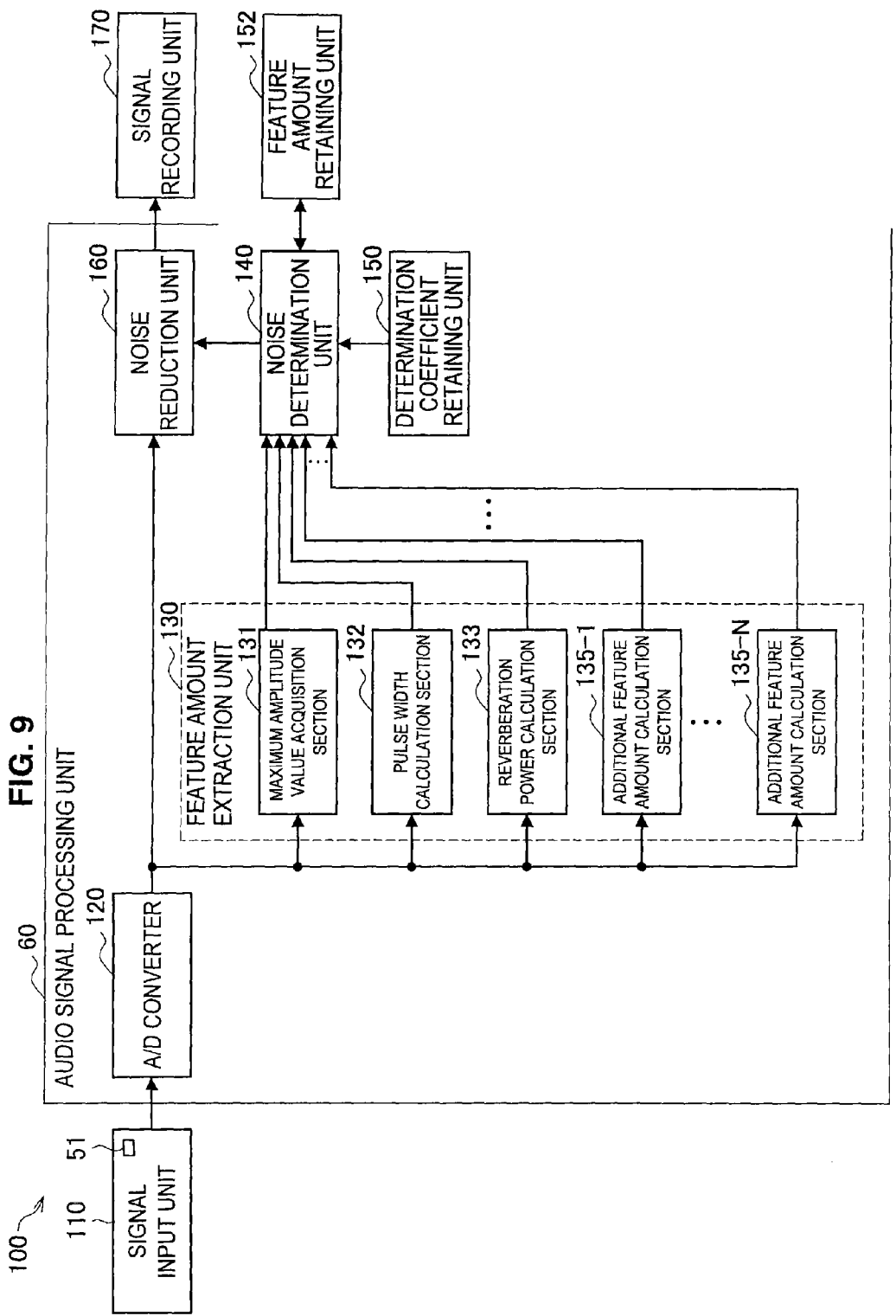
FIG. 9 is a block diagram illustrating a functional configuration of an audio signal processing device according to a fourth embodiment of the present disclosure.

First, with reference to FIG. 9, a functional configuration of the audio signal processing device 100 according to the fourth embodiment will be described. FIG. 9 is a block diagram illustrating the functional configuration of the audio signal processing device 100 according to the fourth embodiment.

As illustrated in FIG. 9, the audio signal processing device 100 includes the signal input unit 110, the A/D converter 120, the feature amount extraction unit 130, the noise determination unit 140, the determination coefficient retaining unit 150, the noise reduction unit 160, and the signal recording unit 170 as in the first embodiment. Furthermore, the audio signal processing device 100 is characterized by including a feature amount retaining unit 152 that is connected to the feature amount extraction unit 130 and the noise determination unit 140.

In the fourth embodiment, the feature amount extraction unit 130 can set a section (frame) of an audio signal for calculating a feature amount in an arbitrary position. In addition, the feature amount extraction unit 130 computes feature amounts from a plurality of sections (a plurality of frames) in an arbitrary position of an audio signal, and then outputs the results to the noise determination unit 140. The noise determination unit 140 stores the plurality of feature amounts in the feature amount retaining unit 152. The feature amount retaining unit 152 is configured by a memory device such as a semiconductor memory, and temporarily retains the feature amounts computed by the feature amount extraction unit 130. The feature amount extraction unit 130 can retain the feature amounts in an arbitrary period, and in order to suppress an amount of stored data, old feature amount data may be sequentially deleted.

The feature amount extraction unit 130 may calculate the various kinds of feature amounts (for example, the maximum amplitude value A, the pulse width W, the reverberation component power P, and the additional feature amount B) from a plurality of sections of an audio signal. Alternatively, the feature amount extraction unit 130 may calculate some feature amounts (for example, the maximum amplitude value A and the pulse width W) from a plurality of sections of an audio signal, and calculate the other feature amounts (for example, the reverberation component power P and the additional feature amount B) from one section of the audio signal.

In this manner, the feature amounts computed from the plurality of sections (frames) of the audio signal are retained in the feature amount retaining unit 152. The noise determination unit 140 reads the feature amounts computed from the plurality of sections of the audio signal from the feature amount retaining unit 152, and determines the presence or absence of an audio signal based on the plurality of feature amounts. In this case, the noise determination unit 140 may compute the sum or the average value of the plurality of feature amounts, and then determine the presence or absence of an audio signal based on the computed value.

Since the presence or absence of a pulsed mechanical sound is determined by the noise determination unit 140 as in the first embodiment, for example, the determination method using the statistical identification method, the determination method using table determination, or the like may be used in the fourth embodiment as well. The determination methods are the same as in the first or the third embodiment, and detailed description thereof is omitted.

4.2. Effect

Hereinabove, the configuration of the audio signal processing device 100 according to the fourth embodiment of the present disclosure has been described. The procedure of an audio signal processing method using the audio signal processing device 100 is the same as in the first embodiment (refer to FIG. 5).

According to the fourth embodiment, the presence or absence of an audio signal is determined using a plurality of feature amounts computed from a plurality of sections of the audio signal. Particularly, it is preferable that, by computing the sum or the average value of the plurality of feature amounts and setting the computed value as a new feature amount, the presence or absence of an audio signal be determined based on the feature amount.

Accordingly, stability in determination can increase and accuracy in determination can improve. When a noise other than a pulsed mechanical sound is included in an audio signal or when a background sound changes, for example, there are cases in which it is difficult to compute appropriate feature amounts only from one section of the audio signal. For this reason, by computing a plurality of feature amounts from a plurality of sections in an audio signal as described in the embodiment, influence of an abnormal value or a peculiar value of the audio signal can be suppressed. Thus, appropriate feature amounts are stably computed, and accordingly, accuracy in determining the presence or absence of a pulsed mechanical sound can improve.

Although the fourth embodiment described above has the configuration in which the feature amount retaining unit 152 is provided in the later part of the feature amount extraction unit 130 to retain computed feature amounts, the present technology is not limited to the example. Feature amounts may be computed from a plurality of sections of an audio signal in such a way that, for example, a signal retaining unit that retains data of some sections of an AD converted audio signal is provided in the front part of the feature amount extraction unit 130, and the feature amount extraction unit 130 reads data of arbitrary sections of the audio signal from the signal retaining unit. Accordingly, the noise determination unit 140 can determine the presence or absence of a pulsed mechanical sound based on the feature amounts of the plurality of sections of the audio signal.

5. Fifth Embodiment

Next, an audio signal processing device and an audio signal processing method according to a fifth embodiment of the present disclosure will be described. The audio signal processing device according to the fifth embodiment is characterized in that a control signal of the driving device 14 that is a generation source of a pulsed mechanical sound is acquired, and the feature amount extraction process and the noise determination process are performed only in the driving period of the driving device 14. Since other functional configurations of the fifth embodiment are substantially the same as those of the first embodiment, detailed description thereof will be omitted.

5.1. Functional Configuration of an Audio Signal Processing Device

Figure 10:
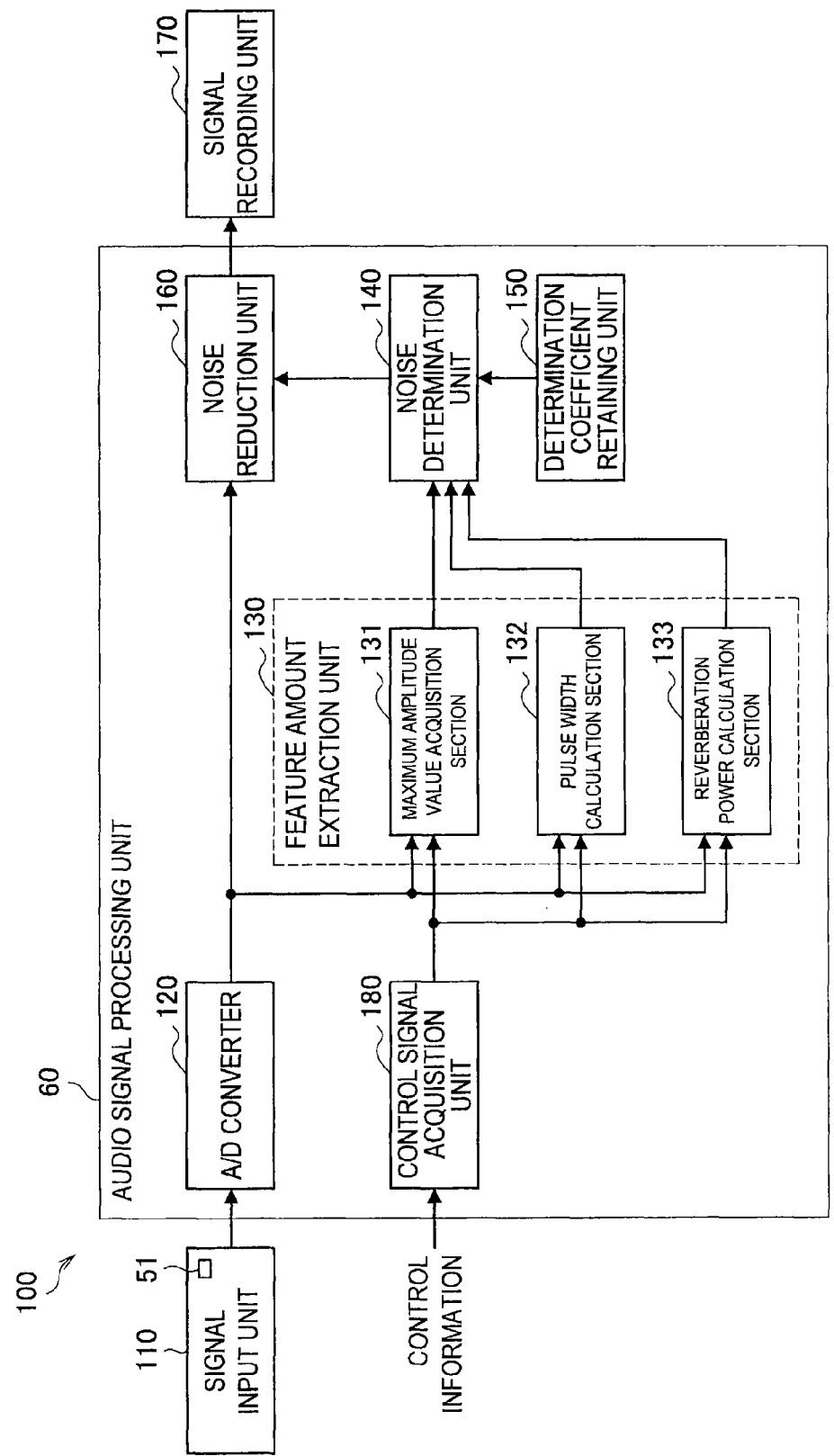
FIG. 10 is a block diagram illustrating a functional configuration of an audio signal processing device according to a fifth embodiment of the present disclosure.

First, with reference to FIG. 10, a functional configuration of the audio signal processing device 100 according to the fifth embodiment will be described. FIG. 10 is a block diagram illustrating the functional configuration of the audio signal processing device 100 according to the fifth embodiment.

As illustrated in FIG. 10, the audio signal processing device 100 includes the signal input unit 110, the A/D converter 120, the feature amount extraction unit 130, the noise determination unit 140, the determination coefficient retaining unit 150, the noise reduction unit 160, and the signal recording unit 170 as in the first embodiment. Furthermore, the audio signal processing device 100 is characterized by including a control signal acquisition unit 180 connected to the feature amount extraction unit 130.

The driving device 14 that is a generation source of a pulsed mechanical sound is controlled according to a control signal generated by the control unit 70 (refer to FIG. 1) of the digital camera 1. The control signal corresponds to driving control information for controlling driving of the driving device 14, and for example, is a control signal for driving the zoom motor 15 or the focus motor 16 of the digital camera 1. With the control signal, driving or non-driving of the driving device 14 is determined, and a period in which a pulsed mechanical sound can be generated from the driving device 14 can be detected.

When the driving device 14 does not operate (a non-driving period), a pulsed mechanical sound is not generated, and thus it is not necessary to execute the feature amount extraction process and the noise determination process described above. On the other hand, when the driving device 14 operates (a driving period), a pulsed mechanical sound is generated, and thus it is necessary to execute the feature amount extraction process and the noise determination process described above. Therefore, if it is possible to acquire a control signal and then detect a driving period of the driving device 14, the processes can be executed only in the driving period, and an amount of computation can be accordingly reduced.

Thus, the audio signal processing device 100 according to the fifth embodiment acquires the control signal from the control unit 70, or the like, and executes the feature amount extraction process and the noise determination process described above only in the driving period of the driving device 14. In more detail, the audio signal processing device 100 includes the control signal acquisition unit 180 that acquires control signals for controlling the driving device 14 as illustrated in FIG. 10. The control signal acquisition unit 180 receives a control signal transmitted from the control unit 70 and then outputs the signal to the feature amount extraction unit 130.

The feature amount extraction unit 130 has a memory part such as a buffer memory or the like not shown in the drawing to buffer an audio signal input from the microphone 51. In addition, the feature amount extraction unit 130 monitors whether or not the control signal acquisition unit 180 acquires a control signal. Then, when a control signal indicating driving start of the driving device 14 is acquired, the feature amount extraction unit 130 reads an audio signal stored in the buffer memory, starts executing a process of computing the various feature amounts, and then ends the execution of the process when a control signal indicating driving end of the driving device 14 is acquired. In this manner, the feature amount extraction unit 130 determines a period in which the driving device 14 operates using the control signal, and then executes the feature amount extraction process only in the driving period of the driving device 14. In the same manner, the noise determination unit 140 also determines the driving period of the driving device 14 using the control signal, and executes the noise determination process described above only in the driving period of the driving device 14 using the feature amounts obtained from the feature amount extraction unit 130.

5.2. Audio Signal Processing Method

Figure 11:
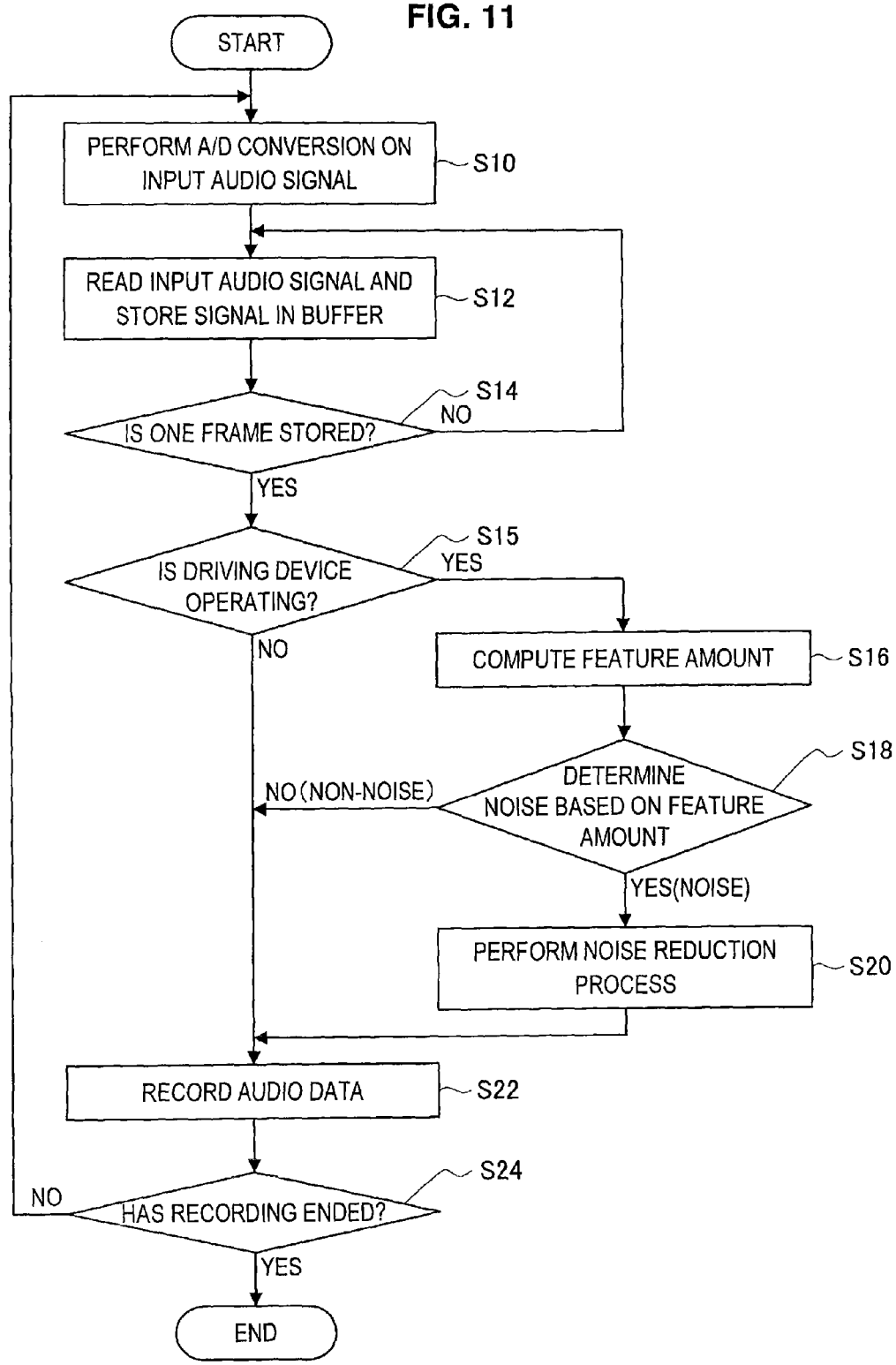
FIG. 11 is a flowchart for describing an audio signal processing method according to the embodiment.

Next, with reference to FIG. 11, the audio signal processing method (a mechanical sound reduction method) using the audio signal processing device 100 according to the fifth embodiment will be described. FIG. 11 is a flowchart for describing the audio signal processing method according to the present embodiment.

As described in FIG. 11, the audio signal processing device 100 according to the fifth embodiment first performs A/D conversion on an audio signal input from the microphone 51 (S10), and stores the signal in the buffer (S12). The processes from S10 to S12 are the same as those of the first embodiment.

Then, after data of the audio signal for one frame that is a unit of processing in the noise determination process is stored in the buffer (S14), the feature amount extraction unit 130 determines whether or not the driving device 14 that is a noise generation source is operating, in other words, is in a driving period (S15). For example, in S15, the feature amount extraction unit 130 determines whether or not the driving device is in a driving period based on whether or not a control signal of the driving device 14 has been received from the control unit 70 of the main body of the digital camera 1. A period in which the control signal is received is determined to be a driving period in which the driving device 14 operates, and on the other hand, a period in which the control signal is not received is determined to be a non-driving period in which the driving device 14 does not operate.

As a result, when it is determined to be a driving period of the driving device 14, the feature amount extraction unit 130 computes feature amounts indicating a pulsed mechanical sound (S16) from the data of the audio signal for one frame of the input audio signal, and the noise determination unit 140 determines whether or not a pulsed mechanical sound is included in the one frame using the feature amounts A, W, and P obtained in S16 and the determination coefficients (S18), as in the first embodiment. As a result, when a pulsed mechanical sound is determined to be included therein, the noise reduction unit 160 executes the noise reduction process on the one frame of the input audio signal to remove noises including the pulsed mechanical sound (S20). Then, the signal recording unit 170 records the audio signal from which noises are removed in S20 on a recording medium (S22).

On the other hand, when it is determined not to be a driving period of the driving device 14 in S15, the feature amount computation process by the noise determination unit 140 and the determination process of the presence or absence of a pulsed mechanical sound by the noise determination unit 140 are not performed, unlike in the first embodiment. Then, the signal recording unit 170 records the input audio signal on a recording medium without change (S22).

Then, the processes of S10 to S22 are repeated on the next one frame of the input audio signal until an imaging and sound-recording operation by the digital camera 1 ends (S24).

5.3. Effect

Hereinabove, the configuration of the audio signal processing device 100 according to the fifth embodiment of the present disclosure and the audio signal processing method using the device have been described.

According to the fifth embodiment, driving or non-driving of the driving device 14 is determined using control information of the driving device 14, and the feature amount extraction process and the noise determination process are executed only in an operation period of the driving device 14. Thus, the computation processes may not be performed in a non-driving period of the driving device 14, and accordingly, a computation amount can be reduced. Particularly, in an imaging operation period of the digital camera 1, the driving device 14 such as the zoom motor 15 does not frequently operate, and the operation period of the driving device 14 accounts for only a short period of time in the entire imaging operation period. Thus, when the processes described above are executed in a driving period and not executed in a non-driving period, a computation amount can be drastically reduced.

In addition, when the processes are performed in a non-driving period of the driving device 14, there is concern of a noise determination error when a pulsed mechanical sound is erroneously determined to be present. However, according to the fifth embodiment, occurrence of such a noise determination error can also be reduced, and thus an audio signal with high quality that is close to the original sound can be recorded.

6. Sixth Embodiment

Next, an audio signal processing device and an audio signal processing method according to a sixth embodiment of the present disclosure will be described. The audio signal processing device according to the sixth embodiment is characterized in that the determination coefficients are changed according to a characteristic of the driving device 14 that is a noise generation source, and using the determination coefficient and feature amounts, the presence or absence of a pulsed mechanical sound unique to the driving device 14 is determined. Since other functional configurations of the sixth embodiment are substantially the same as those of the first embodiment, detailed description thereof will be omitted.

6.1. Overview of a Noise Determination Method

A characteristic of the pulsed mechanical sound changes according to a characteristic of a sound generation unit (the driving device 14, or the like) that generates the pulsed mechanical sound. In a single-lens reflex camera, for example, a plurality of kinds of exchangeable lens devices (for example, one corresponding to the imaging unit 10 of FIG. 1) can be attached to or detached from the main body of a camera. In this case, the characteristic of the pulsed mechanical sound collected in the digital camera 1 changes according to a characteristic of the installed lens device (for example, the type, arrangement, or the like of the driving device 14 that drives the lens). Thus, it is preferable to set parameters of various coefficients, tables, the threshold values of feature amounts, and the like (hereinafter referred to as "determination coefficients") used in the noise determination process according to a characteristic of a lens device actually installed in the digital camera 1.

Thus, in the sixth embodiment, determination coefficients corresponding to characteristics of each exchangeable lens device are set in advance. Then, using the determination coefficients corresponding to a lens device installed in the digital camera 1 in an actual noise determination process, it is determined whether or not a noise (pulsed mechanical sound) unique to the lens device is included in an input audio signal. In this manner, by changing the determination coefficients used in noise determination, a noise unique to each lens device can be detected with high accuracy.

Here, each determination coefficient is a parameter used in determining the presence or absence of a pulsed mechanical sound. For example, the determination coefficients include the load $w_i$, $w_j$, and threshold value $y_0$ in the expression (1) based on the statistical identification method and the threshold values $A_0$, $W_0$, $P_0$, . . . of the feature amounts, and the threshold value $z_0$ of the number of determination items z in the table 142 (refer to FIG. 4) based on the table determination method, and the like. If a pulsed mechanical sound generated from the driving device 14 of various lens devices is analyzed in advance and the various determination coefficients are set according to the analysis result, an appropriate noise reduction process for each lens device can be realized.

6.2. Functional Configuration of an Audio Signal Processing Device

Figure 12:
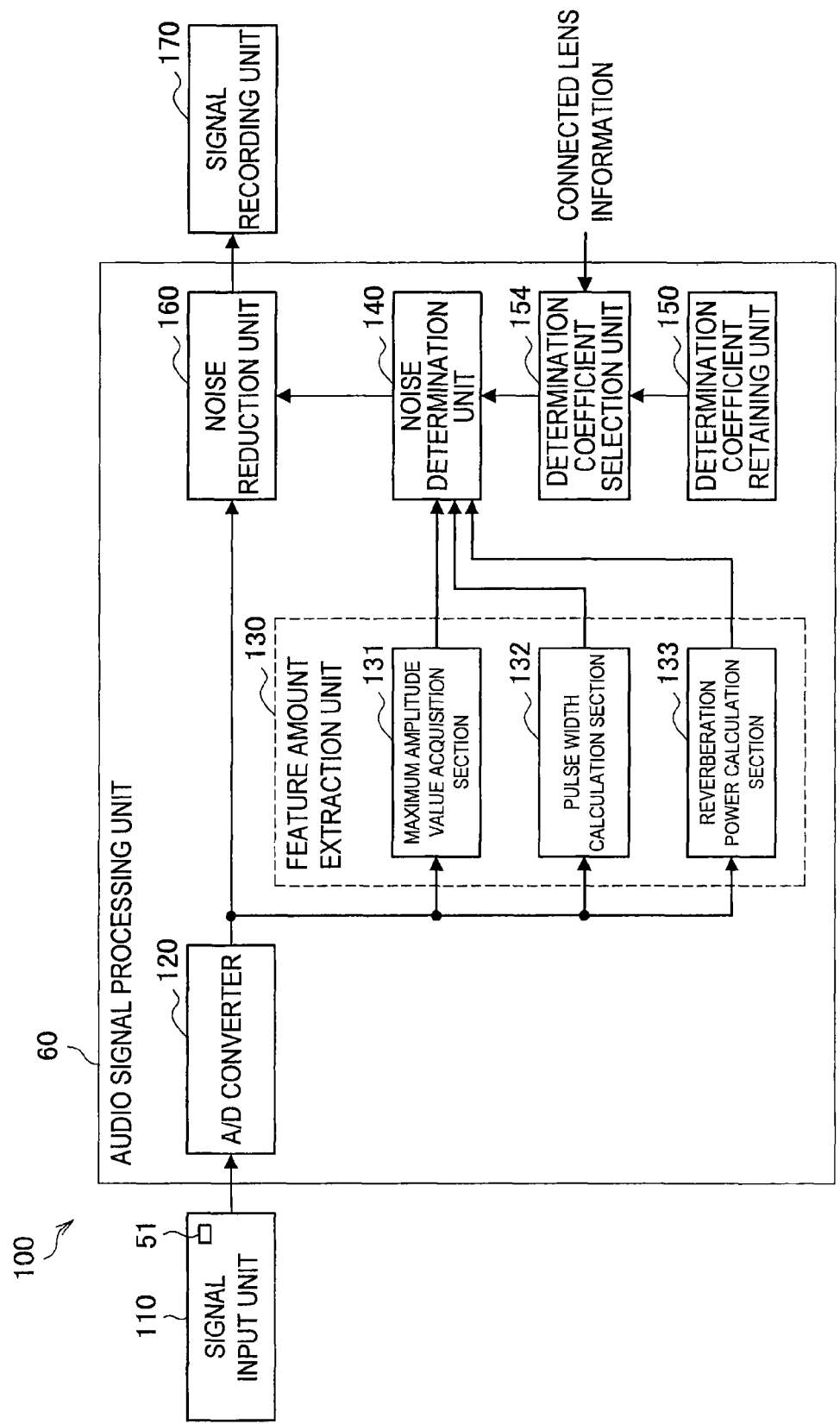
FIG. 12 is a block diagram illustrating a functional configuration of an audio signal processing device according to a sixth embodiment of the present disclosure.

Next, with reference to FIG. 12, a functional configuration of the audio signal processing device 100 according to the sixth embodiment will be described. FIG. 12 is a block diagram illustrating the functional configuration of the audio signal processing device 100 according to the sixth embodiment.

As illustrated in FIG. 12, the audio signal processing device 100 includes the signal input unit 110, the A/D converter 120, the feature amount extraction unit 130, the noise determination unit 140, the determination coefficient retaining unit 150, the noise reduction unit 160, and the signal recording unit 170 as in the first embodiment. Furthermore, the audio signal processing device 100 is characterized by including a determination coefficient selection unit 154 that selects a determination coefficient corresponding to a lens device connected to the digital camera 1 from a plurality of determination coefficients.

The determination coefficient selection unit 154 retains a plurality of pre-set determination coefficients for each of various lens devices. The determination coefficients retained in the determination coefficient selection unit 154 are set in advance according to a characteristic of the driving device 14 of each of the lens devices and a characteristic of a pulsed mechanical sound generated from the driving device 14. The maximum amplitude value and the pulse width of a pulse component of the pulsed mechanical sound, a frequency band of a reverberation component, the number of zero-crossing times, and the like differ depending on the lens devices. Thus, the determination coefficient values are set in accordance with characteristics of the pulse component and reverberation component unique to the pulsed mechanical sound generated in each of the lens devices. In addition, the determination coefficient selection unit 154 retains the determination coefficients corresponding to the lens devices in association with identification information of the lens devices.

In addition, the determination coefficient selection unit 154 acquires information indicating one lens device actually connected to the digital camera 1 (connected lens information) from the corresponding lens device, the control unit 70, or the like. The connected lens information is identification information (for example, the model number, the title, and the like of a lens device) that is distinctively given to each kind of the lens devices. The determination coefficient selection unit 154 specifies a lens device connected to the digital camera 1 based on the connected lens information, and then selects one determination coefficient corresponding to the lens device from the plurality of determination coefficients retained in the determination coefficient retaining unit 150.

Then, the noise determination unit 140 performs the noise determination process using the determination coefficient selected by the determination coefficient selection unit 154 and the feature amounts obtained by the feature amount extraction unit 130, thereby determining the presence or absence of a pulsed mechanical sound unique to the lens device. In the noise determination process, for example, the determination method using the statistical identification method, the determination method using table determination, or the like can be used in the same manner as in the first embodiment.

In the configuration example illustrated in FIG. 12 as described above, the determination coefficient retaining unit 150 provided in the audio signal processing device 100 retains in advance the plurality of determination coefficients each corresponding to the plurality of kinds of exchangeable lens devices that can be installed in the digital camera 1. In addition, during the actual noise determination process, a determination coefficient corresponding to one lens device that is actually installed in the digital camera 1 is selected from the plurality of determination coefficients retained in the determination coefficient retaining unit 150 to be used in the noise determination process.

6.3. Modified Example of the Audio Signal Processing Device

Figure 13:
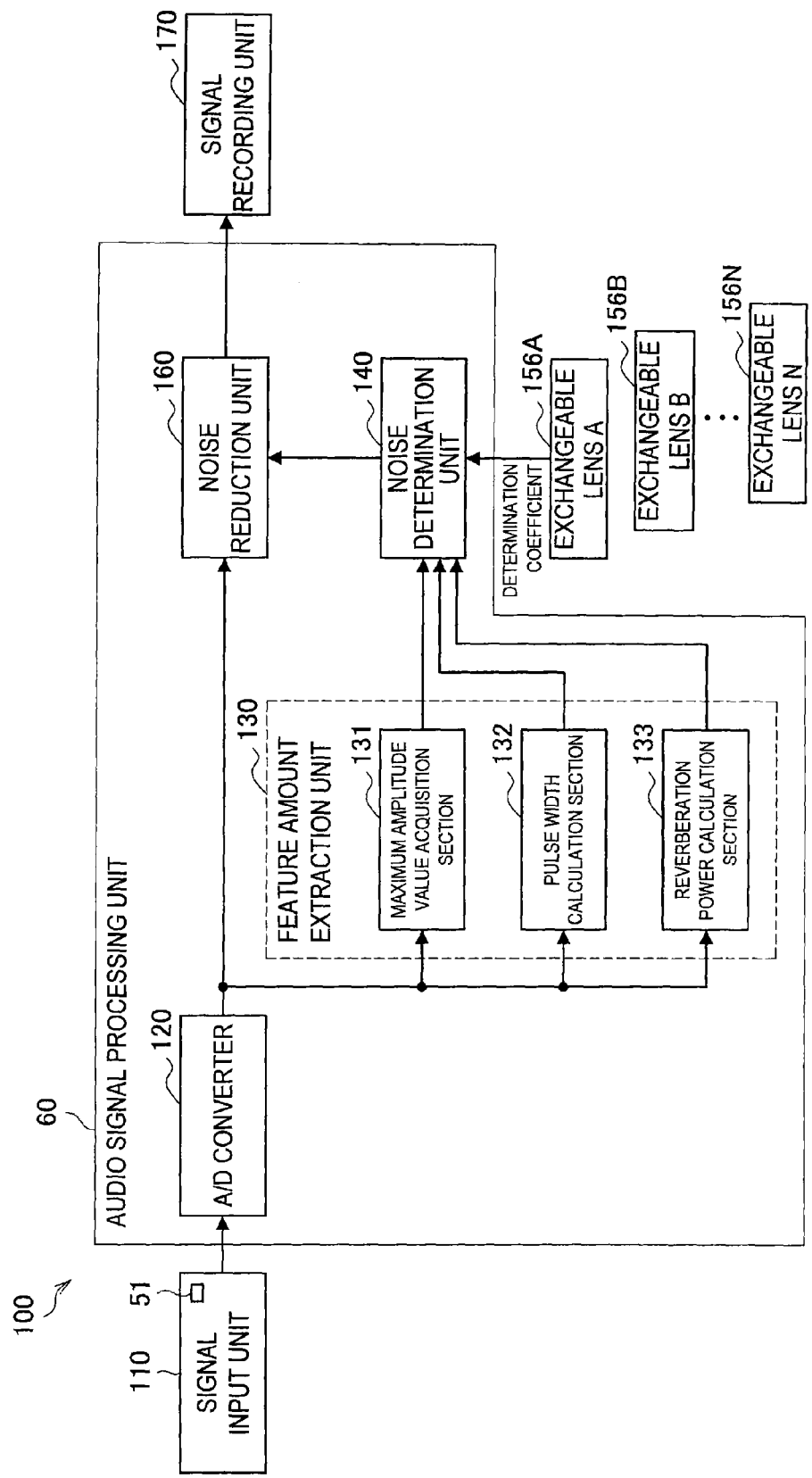
FIG. 13 is a block diagram illustrating a functional configuration of an audio signal processing device according to a modified example of the sixth embodiment of the present disclosure.

Next, with reference to FIG. 13, a modified example of the audio signal processing device 100 according to the sixth embodiment will be described. FIG. 13 is a block diagram illustrating the modified example of the audio signal processing device 100 according to the sixth embodiment.

In the example illustrated in FIG. 13, the audio signal processing device 100 does not include the determination coefficient retaining unit 150 and the determination coefficient selection unit 154, unlike the example of FIG. 12 described above, and determination coefficients necessary for noise determination are retained in each of exchangeable lens devices 156A to 156N rather than in the audio signal processing device 100. The determination coefficients retained in the exchangeable lens devices 156A to 156N are set in advance according to characteristics of the lens devices 156A to 156N, a characteristic of the pulsed mechanical sound, and the like in the same manner as described above.

In addition, when the lens device 156A is connected to the digital camera 1, the noise determination unit 140 of the audio signal processing device 100 acquires, from the lens device 156A, a determination coefficient corresponding to the lens device 156A. For example, the control unit 70 of the digital camera 1 acquires the determination coefficient together with identification information of the lens device 156A, and the noise determination unit 140 receives the determination coefficient transmitted from the control unit 70. Furthermore, the noise determination unit 140 determines the presence or absence of the pulsed mechanical sound unique to the lens device 156A using the determination coefficient acquired from the connected lens device 156A and feature amounts obtained by the feature amount extraction unit 130.

As described above, in the configuration example of FIG. 13, the determination coefficients necessary for noise determination are retained in the respective lens devices 156. In addition, during an actual noise determination process, a determination coefficient is acquired from the lens device 156A that is actually connected to the digital camera 1 to be used in the noise determination process.

6.4. Effect

Hereinabove, the configuration of the audio signal processing device 100 according to the sixth embodiment of the present disclosure has been described. The procedure of the audio signal processing method using the audio signal processing device 100 is the same as that of the first embodiment (refer to FIG. 5).

According to the sixth embodiment, a determination coefficient used in the noise determination changes according to a characteristic of an exchangeable lens device connected to the digital camera 1. Accordingly, since a pulsed mechanical sound unique to the connected lens device can be determined and detected with high accuracy, noise reduction accuracy can sharply increase. Particularly, in an apparatus such as a single-lens reflex camera in which different kinds of lens devices can be installed, a pulsed mechanical sound different from the lens devices is appropriately reduced, and thereby a high-quality background sound can be recorded.

Furthermore, in the example illustrated in FIG. 12, as the determination coefficient retaining unit 150 of the audio signal processing device 100 retains the determination coefficients corresponding to the plurality of different lens devices, the audio signal processing device can flexibly respond to pulsed mechanical sounds generated from all of the lenses. In addition, by performing updating (addition, deletion, or change) of the determination coefficients retained in the determination coefficient retaining unit 150, the audio signal processing device can also respond to a lens device of a new type.

Furthermore, in the example illustrated in FIG. 13, appropriate determination coefficients are set to be retained in lens devices, and a determination coefficient is acquired from a lens device that is connected to the digital camera 1. Accordingly, a determination coefficient can be changed for each lens device as in FIG. 12 even for a lens device 156 of a new type, without re-writing determination coefficients retained in a memory unit (ROM, or the like) of the audio signal processing device 100 that is mounted in the existing digital camera 1. In this manner, the example of FIG. 13 is advantageous in that addition, deletion, change, or the like of the exchangeable lens devices 156 can be flexibly performed even without updating internal information of the existing digital camera 1.

Although the example in which determination coefficients are changed when an exchangeable lens device is connected to or disconnected from the digital camera 1 has been described above, the present technology is not limited to the example. A determination coefficient may also be changed in the same manner as described above when, for example, there are a plurality of sound generation units (a plurality of driving devices 14, or the like) that generate pulsed mechanical sound having different characteristics in an apparatus mounted with an audio signal processing device, when the plurality of sound generation units are selectively attached to or detached from the apparatus, and the like.

7. Seventh Embodiment

Next, an audio signal processing device and an audio signal processing method according to a seventh embodiment of the present disclosure will be described. In the above, the example in which the audio signal processing device 100 is provided in a recording apparatus such as the digital camera 1, or the like to reduce noises during recording of audio signals has been described. On the other hand, the seventh embodiment is characterized in that an audio signal processing device is provided in a reproduction apparatus and noises are reduced during reproduction of recorded audio signals. Since other functional configurations of the seventh embodiment are substantially the same as those of the first embodiment, detailed description thereof will be omitted.

7.1. Functional Configuration of an Audio Signal Processing Device

Figure 14:
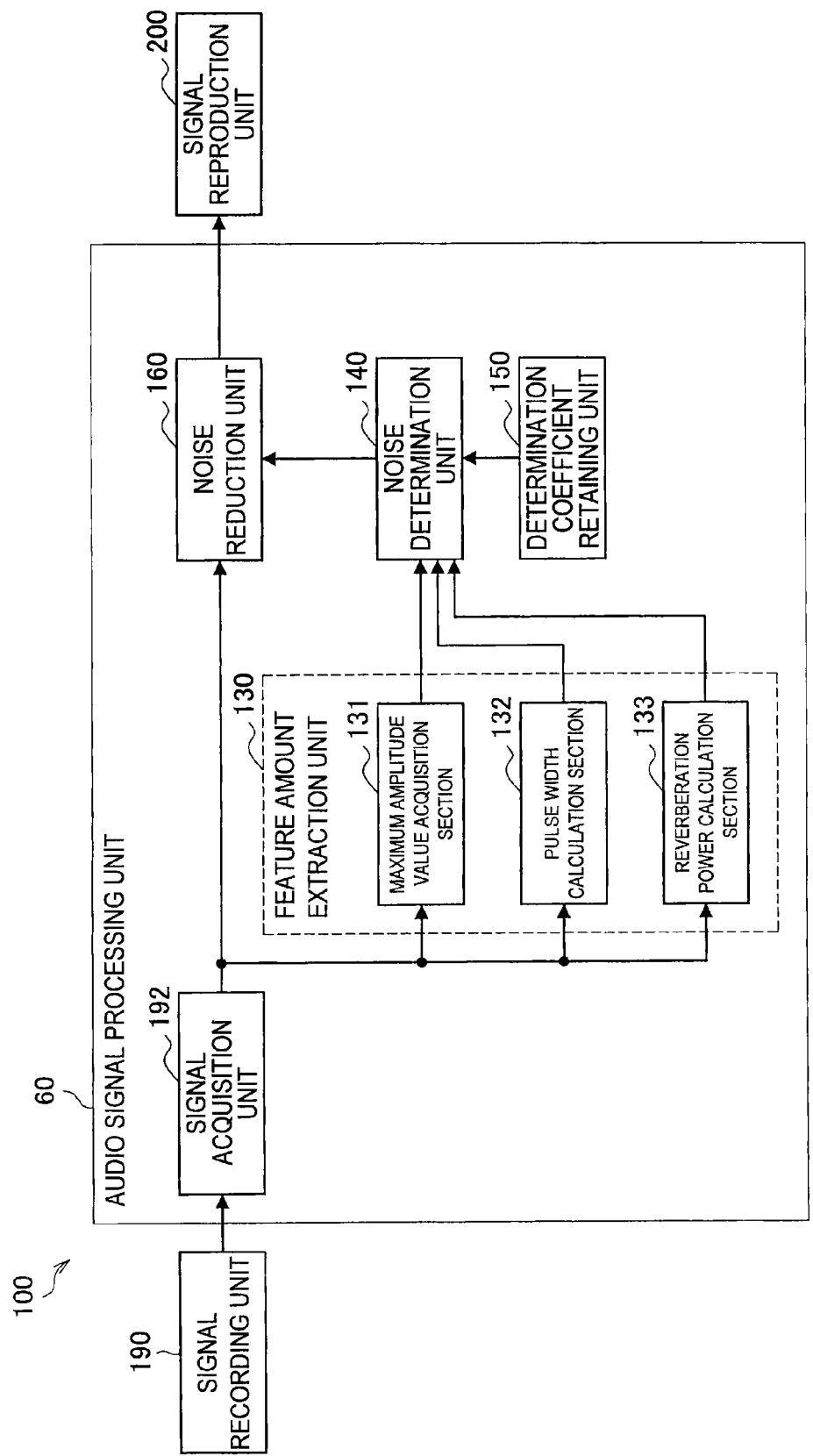
FIG. 14 is a block diagram illustrating a functional configuration of an audio signal processing device according to a seventh embodiment of the present disclosure.

Next, with reference to FIG. 14, a functional configuration of the audio signal processing device 100 according to the seventh embodiment will be described. FIG. 14 is a block diagram illustrating the functional configuration of the audio signal processing device 100 according to the seventh embodiment.

As illustrated in FIG. 14, the audio signal processing device 100 is applied to a reproduction apparatus that includes a signal recording unit 190 and a signal reproduction unit 200, and is characterized in that various processes such as feature amount extraction, noise determination, noise reduction, and the like are executed on audio signals that are read from the signal recording unit 190 and to be reproduced. The audio signal processing device 100 includes the feature amount extraction unit 130, the noise determination unit 140, the determination coefficient retaining unit 150, and the noise reduction unit 160 as in the first embodiment. Furthermore, the audio signal processing device 100 includes a signal acquisition unit 192 that acquires audio signals to be reproduced from the signal recording unit 190.

The signal recording unit 190 is furnished with a recording medium (not shown) such as a hard disk, an optical disc, a semiconductor memory, or a tape. On the recording medium, audio signal data is recorded during imaging and sound-recording by the digital camera 1, or the like. It is not necessary to retain control signals of the zoom motor 15, the focus motor 16, and the like in association with audio signals.

In addition, the signal recording unit 190 reads audio signals to be reproduced from the recording medium based on instructions from a control unit not shown. The signal acquisition unit 192 acquires audio signal data to be reproduced from the signal recording unit 190, and outputs the data to the feature amount extraction unit 130 and the noise reduction unit 160. At this moment, the signal acquisition unit 192 acquires, for example, data of a section of about 512 samples or 1024 samples as one frame.

Then, in the same manner as in the first embodiment, a feature amount computation process and a noise determination process are performed respectively by the feature amount extraction unit 130 and the noise determination unit 140. At this moment, determination coefficients used in noise determination may be retained in the determination coefficient retaining unit 150, or may be recorded in association with audio signals on the recording medium of the signal recording unit 190.

As a result of the determination, when a pulsed mechanical sound is determined to be included in an audio signal to be reproduced, the noise reduction unit 160 reduces the pulsed mechanical sound from the audio signal. The audio signal of which the pulsed mechanical sound is reduced is output to the signal reproduction unit 200. The signal reproduction unit 200 is configured by, for example, a sound reproduction device such as a speaker, or a headphone, and reproduces the audio signal of which the noise is reduced.

7.2. Effect

Hereinabove, the configuration of the audio signal processing device 100 according to the seventh embodiment of the present disclosure has been described. The procedure of an audio signal processing method using the audio signal processing device 100 is the same as in the first embodiment (refer to FIG. 5). However, in order to reduce noises during sound reproduction in the seventh embodiment, the A/D conversion process (S10) of FIG. 5 is unnecessary, the audio signal is reproduced in S22, and the processes of S12 to S22 are repeated until reproduction of data of all audio signal to be reproduced is completed (S24).

According to the seventh embodiment, not only during recording (imaging, sound-recording, or the like) of audio signals, but also during reproduction of recorded audio signals, a pulsed mechanical sound included in audio signals to be reproduced can be appropriately reduced.

8. Conclusion

Hereinabove, the audio signal processing devices and the audio signal processing methods according to exemplary embodiments of the present disclosure have been described. According to the embodiments, even when a pulsed mechanical sound is generated when an operation of the driving device 14 starts or ends, the pulsed mechanical sound and a section thereof (noise section) can be detected from audio signals collected by the microphone 51 with high accuracy. In addition, by performing the noise reduction process in the detected noise section, a high-quality sound can be provided with no concern of deterioration in sound quality of a non-noise section.

In such a case, a pulsed mechanical sound can be detected only using actually input audio signals, without using a control signal of the driving device 14. Thus, the noise reduction process can be realized by accurately targeting a noise period in which a pulsed mechanical sound is actually included and a noise reduction process period. Thus, the problems of lowering of noise reduction accuracy and deterioration in sound quality caused by a delay between a control signal and a noise section can be resolved.

Furthermore, by comprehensively determining the presence or absence of a pulsed mechanical sound based on a combination of various feature amounts (the maximum amplitude value A, the pulse width W, the reverberation component power P, the number of zero-crossing times N, and the like) unique to the pulsed mechanical sound, the pulsed mechanical sound perceived by the human ear can be accurately detected. Thus, an abnormal operation of performing the reduction process in a non-noise section in which no noise is perceived by the human ears, or not performing the reduction process in a noise section in which a noise is perceived can be resolved, and thereby a highly-accurate noise reduction process can be realized.

In addition, since a pulsed mechanical sound can be determined based only on an audio signal without using a drive control signal (control signal) of the driving device 14, a system configuration of an apparatus to which the audio signal processing device 100 is applied can be simplified. In addition, not only during collecting and recording of audio signals but also during reproduction of audio signals recorded on the recording medium, determination of presence or absence and the reduction process of a noise can be executed.

Hereinabove, the preferred embodiments of the present invention have been described in detail above with reference to the accompanying drawings, whilst the present invention is not limited to the above examples, of course. A person skilled in the art may find various alternations and modifications within the scope of the appended claims, and it should be understood that they will naturally come under the technical scope of the present invention.

In the embodiments, for example, the digital camera 1 is mainly exemplified as an audio signal processing device, and the example in which a mechanical sound is reduced during capturing of a moving image and recording sounds has been exemplified, however, the present technology is not limited thereto. The audio signal processing device of the present technology can be applied to various audio signal recording devices or electronic apparatuses such as audio signal reproduction devices. For example, the audio signal processing device can be applied to an arbitrary electronic apparatus such as a recording and reproduction device (for example, a Blu-ray disc and DVD recorder), a television receiver set, a system stereo device, an imaging device (for example, a digital camera, and a digital video camera), a mobile terminal (for example, a mobile music and video player, a mobile game device, and an IC recorder), a personal computer, a game device, a car navigation system, a digital photo frame, a home appliance, a vending machine, an ATM, a kiosk terminal, and the like.

Additionally, the present technology may also be configured as below.

(1)
An audio signal processing device including:
a feature amount extraction unit configured to extract, from an audio signal obtained by a sound collection unit, a feature amount that indicates a pulsed operation sound generated from a sound generation unit provided in a same housing as the sound collection unit; and
a noise determination unit configured to determine whether or not the operation sound is included in the audio signal based on the feature amount.

(2)
The audio signal processing device according to (1),
wherein the sound generation unit is a driving device provided in the same housing as the sound collection unit, and
wherein the operation sound is a pulsed mechanical driving sound generated when an operation of the driving device starts or ends.

(3)
The audio signal processing device according to (1) or (2),
wherein the feature amount extraction unit extracts a first feature amount that indicates a pulse component of the operation sound and a second feature amount that indicates a reverberation component of the operation sound as the feature amount, and
wherein the noise determination unit determines whether or not the operation sound is included in the audio signal based on the first and second feature amounts.

(4)
The audio signal processing device according to (3),
wherein the first feature amount includes a maximum amplitude value and a pulse width of the pulse component of the operation sound, and
wherein the second feature amount includes power of a narrow-band signal that indicates the reverberation component of the operation sound.

(5)
The audio signal processing device according to (3),
wherein the first feature amount includes a maximum amplitude value and a pulse width of the pulse component of the operation sound, and
wherein the second feature amount includes a number of zero-crossing times of a narrow-band signal that indicates the reverberation component of the operation sound.

(6)
The audio signal processing device according to any one of (3) to (5),
wherein the feature amount extraction unit further extracts, as the feature amount, a third feature amount including some or all of an RMS of the audio signal, a value of change of the RMS, a changed amplitude value of a narrow-band signal that indicates the reverberation component of the operation sound, a number of zero-crossing times of the narrow-band signal, and a value of change of the number of zero-crossing times, and
wherein the noise determination unit determines whether or not the operation sound is included in the audio signal based on the first, second, and third feature amounts.

(7)
The audio signal processing device according to any one of (1) to (6)
wherein the feature amount extraction unit extracts a plurality of feature amounts from a plurality of sections of the audio signal, and
wherein the noise determination unit determines whether or not the operation sound is included in the audio signal based on the plurality of feature amounts extracted from the plurality of sections.

(8)
The audio signal processing device according to (2), further including:
a control signal acquisition unit configured to acquire a control signal for controlling the driving device,
wherein a driving period of the driving device is determined based on the control signal, and an extraction process of the feature amount by the feature amount extraction unit and a determination process by the noise determination unit are executed only in the driving period of the driving device.

(9)

The audio signal processing device according to any one of (1) to (8), wherein the noise determination unit determines whether or not the operation sound unique to the sound generation unit is included in the audio signal using a determination coefficient set according to a characteristic of the sound generation unit and the feature amount.

(10)

The audio signal processing device according to (9)

wherein the audio signal processing device is provided in an imaging device, wherein the sound generation unit is an exchangeable lens device that can be attached to or detached from the main body of the imaging device, wherein the audio signal processing device further including a determination coefficient retaining unit configured to retain a plurality of determination coefficients set for each lens device; and a determination coefficient selection unit configured to select, based on information indicating the lens device connected to the imaging device, a determination coefficient corresponding to the lens device from the plurality of determination coefficients, wherein the noise determination unit determines whether or not the operation sound unique to the lens device that is connected to the imaging device is included in the audio signal using the determination coefficient selected by the determination coefficient selection unit and the feature amount.

(11)

The audio signal processing device according to (9)

wherein the audio signal processing device is provided in an imaging device, wherein the sound generation unit is an exchangeable lens device that is able to be attached to or detached from the main body of the imaging device, wherein the lens device retains a determination coefficient set according to a characteristic of the lens device, and wherein the noise determination unit acquires the determination coefficient from the lens device that is connected to the imaging device, and determines whether or not the operation sound unique to the lens device that is connected to the imaging device is included in the audio signal using the acquired determination coefficient and the feature amount.

(12)

The audio signal processing device according to any one of (1) to (9)

wherein the audio signal processing device is provided in a reproduction device configured to reproduce the audio signal, wherein the feature amount extraction unit extracts the feature amount from the audio signal during reproduction of the audio signal, and wherein the noise determination unit determines whether or not the operation sound is included in the audio signal based on the feature amount.

(13)

An imaging device including:

a sound collection unit configured to convert an external sound into an audio signal;

a sound generation unit configured to be provided in a same housing as the sound collection unit and to generate a pulsed operation sound;

a feature amount extraction unit configured to extract a feature amount that indicates the operation sound from the audio signal output from the sound collection unit;

a noise determination unit configured to determine whether or not the operation sound is included in the audio signal based on the feature amount; and a noise reduction unit configured to perform a noise reduction process on the audio signal when the noise determination unit determines that the operation sound is included in the audio signal.

(14)

An audio signal processing method including:

extracting a feature amount that indicates a pulsed operation sound generated from a sound generation unit provided in a same housing as a sound collection unit, from an audio signal obtained by the sound collection unit; and determining whether or not the operation sound is included in the audio signal based on the feature amount.

(15)

A program for causing a computer to execute:

extracting a feature amount that indicates a pulsed operation sound generated from a sound generation unit provided in a same housing as a sound collection unit, from an audio signal obtained by the sound collection unit; and determining whether or not the operation sound is included in the audio signal based on the feature amount.

(16)

A non-transitory computer-readable recording medium having a program recorded therein, the program causing a computer to execute:

extracting a feature amount that indicates a pulsed operation sound generated from a sound generation unit provided in a same housing as a sound collection unit, from an audio signal obtained by the sound collection unit; and determining whether or not the operation sound is included in the audio signal based on the feature amount.

REFERENCE SIGNS LIST 1 digital camera
2 housing
3 lens unit
10 imaging unit
14 driving device
15 zoom motor
16 focus motor
51 microphone
60 audio signal processing unit
70 control unit
100 audio signal processing device
110 signal input unit
120 A/D converter
130 feature amount extraction unit
131 maximum amplitude value acquisition section
132 pulse width calculation section
133 reverberation power calculation section
134 zero-crossing time calculation section
135 additional feature amount calculation section
140 noise determination unit
142, 144 table
150 determination coefficient retaining unit
152 feature amount retaining unit
154 determination coefficient selection unit
156 lens device 160 noise reduction unit
170, 190 signal recording unit
180 control signal acquisition unit
192 signal acquisition unit
200 signal reproduction unit

The invention claimed is:
1. An audio signal processing device comprising:
a feature amount extraction unit configured to extract, from an audio signal obtained by a sound collection unit, a feature amount that indicates a pulsed operation sound generated from a sound generation unit provided in a same housing as the sound collection unit,
wherein the feature amount extraction unit is further configured to:
extract a first feature amount that indicates a pulse component of the pulsed operation sound and a second feature amount that indicates a reverberation component of the pulsed operation sound as the feature amount, and
extract, as the feature amount, a third feature amount including some or all of an RMS of the audio signal, a value of change of the RMS, a changed amplitude value of a narrow-band signal that indicates the reverberation component of the pulsed operation sound and a value of change of a number of zero-crossing times of the narrow-band signal; and
a noise determination unit configured to determine whether or not the pulsed operation sound is included in the audio signal based on the first, second and third feature amounts.

2. The audio signal processing device according to claim 1,
wherein the sound generation unit is a driving device provided in the same housing as the sound collection unit, and
wherein the pulsed operation sound is a pulsed mechanical driving sound generated when an operation of the driving device starts or ends.

3. The audio signal processing device according to claim 2, further comprising:
a control signal acquisition unit configured to acquire a control signal for controlling the driving device,
wherein a driving period of the driving device is determined based on the control signal, and an extraction process of the feature amount by the feature amount extraction unit and a determination process by the noise determination unit are executed only in the driving period of the driving device.

4. The audio signal processing device according to claim 2,
wherein the driving device is configured to operate one or more of: a zoom device, a diaphragm device, an auto-focus device, a shutter device, and/or a button.

5. The audio signal processing device according to claim 1,
wherein the first feature amount includes a maximum amplitude value and a pulse width of the pulse component of the pulsed operation sound, and
wherein the second feature amount includes power of the narrow-band signal that indicates the reverberation component of the pulsed operation sound.

6. The audio signal processing device according to claim 1,
wherein the first feature amount includes a maximum amplitude value and a pulse width of the pulse component of the pulsed operation sound, and wherein the second feature amount includes a number of zero-crossing times of the narrow-band signal that indicates the reverberation component of the pulsed operation sound.

7. The audio signal processing device according to claim 1,
wherein the feature amount extraction unit is further configured to extract, as the third feature amount the number of zero-crossing times of the narrow-band signal that indicates the reverberation component of the pulsed operation sound.

8. The audio signal processing device according to claim 1,
wherein the feature amount extraction unit is configured to extract a plurality of feature amounts from a plurality of sections of the audio signal, and
wherein the noise determination unit is configured to determine whether or not the pulsed operation sound is included in the audio signal based on the plurality of feature amounts extracted from the plurality of sections.

9. The audio signal processing device according to claim 1,
wherein the noise determination unit is further configured to determine whether or not the pulsed operation sound unique to the sound generation unit is included in the audio signal using a determination coefficient set according to a characteristic of the sound generation unit and the feature amount.

10. The audio signal processing device according to claim 9,
wherein the audio signal processing device is provided in an imaging device,
wherein the sound generation unit is an exchangeable lens device that can be attached to or detached from the main body of the imaging device,
wherein the audio signal processing device further includes:
a determination coefficient retaining unit configured to retain a plurality of determination coefficients set for each lens device; and
a determination coefficient selection unit configured to select, based on information indicating the lens device connected to the imaging device, a determination coefficient corresponding to the lens device from the plurality of determination coefficients,
wherein the noise determination unit is further configured to determine whether or not the pulsed operation sound unique to the lens device that is connected to the imaging device is included in the audio signal using the determination coefficient selected by the determination coefficient selection unit and the feature amount.

11. The audio signal processing device according to claim 9
wherein the audio signal processing device is provided in an imaging device,
wherein the sound generation unit is an exchangeable lens device that is able to be attached to or detached from the main body of the imaging device,
wherein the lens device retains a determination coefficient set according to a characteristic of the lens device, and
wherein the noise determination unit is further configured to acquire the determination coefficient from the lens device that is connected to the imaging device, and determine whether or not the pulsed operation sound unique to the lens device that is connected to the imaging device is included in the audio signal using the acquired determination coefficient and the feature amount.

12. The audio signal processing device according to claim 1
wherein the audio signal processing device is provided in a reproduction device configured to reproduce the audio signal,
wherein the feature amount extraction unit is further configured to extract the feature amount from the audio signal during reproduction of the audio signal, and
wherein the noise determination unit is further configured to determine whether or not the pulsed operation sound is included in the audio signal based on the feature amount.

13. An imaging device comprising:
a sound collection unit configured to convert an external sound into an audio signal;
a sound generation unit configured to be provided in a same housing as the sound collection unit and to generate a pulsed operation sound;
a feature amount extraction unit configured to extract a feature amount that indicates the pulsed operation sound from the audio signal output from the sound collection unit,
wherein the feature amount extraction unit is further configured to:
  extract a first feature amount that indicates a pulse component of the pulsed operation sound and a second feature amount that indicates a reverberation component of the pulsed operation sound as the feature amount, and
  extract, as the feature amount, a third feature amount including some or all of an RMS of the audio signal, a value of change of the RMS, a changed amplitude value of a narrow-band signal that indicates the reverberation component of the pulsed operation sound and a value of change of a number of zero-crossing times of the narrow-band signal;
a noise determination unit configured to determine whether or not the pulsed operation sound is included in the audio signal based on the first, second and third feature amounts; and
a noise reduction unit configured to perform a noise reduction process on the audio signal when the noise determination unit determines that the pulsed operation sound is included in the audio signal.

14. An audio signal processing method comprising:
extracting a feature amount that indicates a pulsed operation sound generated from a sound generation unit provided in a same housing as a sound collection unit, from an audio signal obtained by the sound collection unit;
extracting a first feature amount that indicates a pulse component of the pulsed operation sound and a second feature amount that indicates a reverberation component of the pulsed operation sound as the feature amount;
extracting, as the feature amount, a third feature amount including some or all of an RMS of the audio signal, a value of change of the RMS, a changed amplitude value of a narrow-band signal that indicates the reverberation component of the pulsed operation sound and a value of change of a number of zero-crossing times of the narrow-band signal; and
determining whether or not the pulsed operation sound is included in the audio signal based on the first, second and third feature amounts.

15. A non-transitory computer-readable recording medium having instructions recorded therein, which when executed by a computer causes the computer to execute:
extracting a feature amount that indicates a pulsed operation sound generated from a sound generation unit provided in a same housing as a sound collection unit, from an audio signal obtained by the sound collection unit;
extracting a first feature amount that indicates a pulse component of the pulsed operation sound and a second feature amount that indicates a reverberation component of the pulsed operation sound as the feature amount;
extracting, as the feature amount, a third feature amount including some or all of an RMS of the audio signal, a value of change of the RMS, a changed amplitude value of a narrow-band signal that indicates the reverberation component of the pulsed operation sound and a value of change of a number of zero-crossing times of the narrow-band signal; and
determining whether or not the pulsed operation sound is included in the audio signal based on the first, second and third feature amounts.

* * * * *